United States Patent
Sakhnini et al.

(10) Patent No.: US 12,279,271 B2
(45) Date of Patent: Apr. 15, 2025

(54) INDICATION OF SCHEDULING DELAYS FOR A SHARED CHANNEL WITH BWP SWITCHING IN HIGHER FREQUENCY BANDS

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 17/662,839

(22) Filed: May 10, 2022

(65) Prior Publication Data
US 2022/0369351 A1    Nov. 17, 2022

Related U.S. Application Data

(60) Provisional application No. 63/187,332, filed on May 11, 2021, provisional application No. 63/187,334, filed on May 11, 2021.

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC ........... H04L 27/2602; H04L 27/26025; H04L 5/0005; H04L 5/001; H04L 5/0078;
(Continued)

(56) References Cited

U.S. PATENT DOCUMENTS 11,310,861 B2 *   4/2022   Jeon ..................... H04L 5/001
11,470,590 B2 * 10/2022   Liang ................... H04L 5/0094
(Continued)

FOREIGN PATENT DOCUMENTS

WO     2020221210 A1   11/2020

OTHER PUBLICATIONS

Huawei., et al., "On DCI-Based Multiple BWP Switch Simultaneously", 3GPP TSG RAN WG1 Meeting #103-e, R1-2008775, 3rd Generation Partnership Project (3GPP), Mobile Competence Centre, 650, Route Des Lucioles, F-06921 Sophia-Antipolis Cedex, France, vol. RAN WG1, No. E-meeting, Oct. 26, 2020-Nov. 13, 2020, Oct. 17, 2020, XP051940336, Section 2, Table 1.

(Continued)

*Primary Examiner* — Dung B Huynh
(74) *Attorney, Agent, or Firm* — Kevin M. Donnelly; Procopio, Cory, Hargreaves & Savitch LLP

(57) ABSTRACT

Methods, apparatuses, and computer readable media for indicating a time gap in case of a BWP switch are provided. A base station may transmit to a UE, and the UE may receive from the base station, an indication of a BWP switch from a first BWP to a second BWP. The UE and the base station may communicate with each other via a PDSCH or a PUSCH, in the second BWP based on a time gap. The time gap may be based on at least one of a first time parameter associated with the indication or a second time parameter associated with the BWP switch. The time gap may have a duration that is at least as long as a first duration of a BWP switch delay associated with switching from the first BWP to the second BWP.

28 Claims, 10 Drawing Sheets

(58) Field of Classification Search
CPC ............ H04L 5/0098; H04W 72/0446; H04W 72/0453; H04W 72/1263; H04W 72/23
See application file for complete search history.

(56) References Cited

U.S. PATENT DOCUMENTS

| | | | | |
|---|---|---|---|---|
| 2018/0279289 A1* | 9/2018 | Islam | H04W 72/0446 |
| 2019/0132845 A1* | 5/2019 | Babaei | H04L 1/1812 |
| 2019/0215847 A1* | 7/2019 | Abdoli | H04W 72/0453 |
| 2019/0254056 A1* | 8/2019 | Salah | H04W 72/1263 |
| 2019/0268905 A1* | 8/2019 | Zhou | H04W 72/23 |
| 2019/0342907 A1* | 11/2019 | Huang | H04W 72/12 |
| 2020/0008155 A1* | 1/2020 | Li | H04W 52/10 |
| 2020/0015246 A1* | 1/2020 | Vilaipornsawai | H04L 5/0078 |
| 2020/0053825 A1* | 2/2020 | Hwang | H04W 76/28 |
| 2020/0106573 A1* | 4/2020 | Cirik | H04W 74/0808 |
| 2020/0245207 A1* | 7/2020 | Jiang | H04L 5/0044 |
| 2020/0259601 A1* | 8/2020 | Zhou | H04L 5/0085 |
| 2020/0313831 A1* | 10/2020 | Kim | H04W 72/23 |
| 2020/0314885 A1* | 10/2020 | Cirik | H04L 5/0048 |
| 2020/0344034 A1* | 10/2020 | Moon | H04W 72/1263 |
| 2020/0351738 A1* | 11/2020 | Huang | H04W 36/06 |
| 2020/0351837 A1* | 11/2020 | Hwang | H04L 1/1812 |
| 2021/0007138 A1* | 1/2021 | Xu | H04L 27/2607 |
| 2021/0037484 A1* | 2/2021 | Zhou | H04W 52/325 |
| 2021/0045119 A1* | 2/2021 | Song | H04W 72/0453 |
| 2021/0050985 A1* | 2/2021 | Ang | H04W 72/0446 |
| 2021/0091912 A1* | 3/2021 | Tang | H04L 5/0094 |
| 2021/0099985 A1* | 4/2021 | Ang | H04W 72/23 |
| 2021/0105731 A1* | 4/2021 | Lin | H04L 5/0087 |
| 2021/0127450 A1* | 4/2021 | Abdoli | H04W 52/0219 |
| 2021/0184824 A1* | 6/2021 | Kwak | H04L 5/0094 |
| 2021/0274535 A1* | 9/2021 | Yi | H04W 24/08 |
| 2021/0377988 A1* | 12/2021 | Zhou | H04L 5/0096 |
| 2021/0410128 A1* | 12/2021 | Liao | H04W 72/12 |
| 2022/0007399 A1* | 1/2022 | Rastegardoost | H04L 1/1854 |
| 2022/0046722 A1* | 2/2022 | Kim | H04L 5/0048 |
| 2022/0060990 A1* | 2/2022 | Xu | H04W 76/28 |
| 2022/0070878 A1* | 3/2022 | Lee | H04L 5/0078 |
| 2022/0078798 A1* | 3/2022 | Kumar | H04W 72/542 |
| 2022/0150827 A1* | 5/2022 | Kim | H04L 5/0064 |
| 2022/0166594 A1* | 5/2022 | Zhang | H04W 72/21 |
| 2022/0174766 A1* | 6/2022 | Zhou | H04L 5/00 |
| 2022/0191832 A1* | 6/2022 | Yokomakura | H04W 72/23 |
| 2022/0191880 A1* | 6/2022 | Wei | H04W 72/0453 |
| 2022/0232401 A1* | 7/2022 | Nam | H04L 5/0053 |
| 2022/0232599 A1* | 7/2022 | Xue | H04W 72/23 |
| 2022/0239452 A1* | 7/2022 | Kazmi | H04W 36/06 |
| 2022/0256538 A1* | 8/2022 | Yeo | H04L 5/00 |
| 2022/0264461 A1* | 8/2022 | Chen | H04W 72/0446 |
| 2022/0272744 A1* | 8/2022 | Noh | H04W 72/0453 |
| 2022/0279485 A1* | 9/2022 | Yang | H04W 72/04 |
| 2022/0295528 A1* | 9/2022 | Xue | H04W 52/0216 |
| 2022/0303899 A1* | 9/2022 | Ma | H04W 72/12 |
| 2022/0303991 A1* | 9/2022 | Wu | H04W 8/24 |
| 2022/0312313 A1* | 9/2022 | Ma | H04W 52/0235 |
| 2022/0312440 A1* | 9/2022 | Bagheri | H04W 72/044 |
| 2022/0312469 A1* | 9/2022 | Choi | H04W 72/23 |
| 2022/0322148 A1* | 10/2022 | Sakhnini | H04L 5/0098 |
| 2022/0322452 A1* | 10/2022 | You | H04W 24/02 |
| 2022/0337381 A1* | 10/2022 | Liu | H04L 1/0015 |
| 2022/0345906 A1* | 10/2022 | Kakishima | H04W 52/0216 |
| 2022/0345922 A1* | 10/2022 | Guo | H04W 52/0219 |
| 2022/0346068 A1* | 10/2022 | Nimbalker | H04W 72/0446 |
| 2022/0353893 A1* | 11/2022 | Choi | H04L 5/0053 |
| 2022/0394616 A1* | 12/2022 | Maleki | H04W 52/0216 |
| 2023/0046439 A1* | 2/2023 | Li | H04W 52/0235 |
| 2023/0049868 A1* | 2/2023 | Zhou | H04L 5/0005 |
| 2023/0055394 A1* | 2/2023 | Elshafie | H04B 7/0608 |
| 2023/0064881 A1* | 3/2023 | Liu | H04L 1/0026 |
| 2023/0072549 A1* | 3/2023 | Dai | H04L 5/0092 |
| 2023/0079660 A1* | 3/2023 | Fu | H04W 80/08 370/329 |
| 2023/0079810 A1* | 3/2023 | Zheng | H04W 36/037 370/329 |
| 2023/0098013 A1* | 3/2023 | Ma | H04W 24/08 370/329 |
| 2023/0111063 A1* | 4/2023 | Ji | H04L 5/0057 370/329 |
| 2023/0119379 A1* | 4/2023 | Kim | H04W 72/23 370/311 |
| 2023/0131118 A1* | 4/2023 | Kim | H04W 52/0216 370/311 |
| 2023/0164589 A1* | 5/2023 | Wu | H04W 72/23 370/329 |
| 2023/0171802 A1* | 6/2023 | Nunome | H04W 74/0808 370/329 |
| 2023/0180254 A1* | 6/2023 | Cirik | H04L 5/0044 370/329 |
| 2023/0188280 A1* | 6/2023 | Ji | H04B 7/0628 370/329 |
| 2023/0188306 A1* | 6/2023 | Nory | H04L 5/001 370/330 |
| 2023/0199648 A1* | 6/2023 | Li | H04W 52/0229 370/311 |
| 2023/0224777 A1* | 7/2023 | Raghavan | H04W 36/08 |
| 2023/0232410 A1* | 7/2023 | Zhou | H04L 5/0094 |
| 2023/0239103 A1* | 7/2023 | Ji | H04L 5/0082 |
| 2023/0247501 A1* | 8/2023 | Kim | H04W 36/06 370/331 |
| 2023/0247614 A1* | 8/2023 | Li | H04L 5/0012 370/329 |
| 2023/0269039 A1* | 8/2023 | Gao | H04L 5/001 370/330 |
| 2023/0318686 A1* | 10/2023 | Kwak | H04B 7/088 455/101 |
| 2023/0319708 A1* | 10/2023 | Ma | H04W 8/24 455/574 |
| 2023/0328704 A1* | 10/2023 | Oh | H04W 72/232 370/329 |
| 2023/0371039 A1* | 11/2023 | Tsai | H04W 72/232 |
| 2023/0388089 A1* | 11/2023 | Kwak | H04L 27/2607 |
| 2023/0396298 A1* | 12/2023 | Bae | H04B 7/0626 |
| 2024/0032031 A1* | 1/2024 | Yi | H04L 1/1896 |
| 2024/0049035 A1* | 2/2024 | He | H04W 36/0088 |
| 2024/0072975 A1* | 2/2024 | Rastegardoost | H04W 72/20 |
| 2024/0080830 A1* | 3/2024 | Xu | H04L 5/0098 |
| 2024/0147492 A1* | 5/2024 | Gao | H04L 1/08 |
| 2024/0172028 A1* | 5/2024 | Kazmi | H04W 36/0088 |
| 2024/0187164 A1* | 6/2024 | Chae | H04L 5/0053 |

OTHER PUBLICATIONS

Huawei., et al., "Procedure of Cross-Slot Scheduling for UE Power Saving", 3GPP TSG RAN WG1 Meeting #199, R1-1911873, 3rd Generation Partnership Project (3GPP), Mobile Competence Centre, 650, Route Des Lucioles, F-06921 Sophia-Antipolis Cedex, France, vol. Reno, USA, Nov. 18, 2019-Nov. 22, 2019, Nov. 9, 2019, XP051823055, 10 Pages, Section 4, Example 1.

International Search Report and Written Opinion—PCT/US2022/028769—ISA/EPO—Aug. 26, 2022.

Qualcomm Incorporated: "Cross-slot Scheduling Power Saving Techniques," 3GPP TSG-RAN WG1 #99, R1-1912971, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18-22, 2019, pp. 1-19, Sections 1-3, Sections 2.2.2 and 2.3.3.

ZTE: "Remaining Issue for BWP", 3GPP TSG RAN WG1 Meeting #93, R1-1806135, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018, pp. 1-7, XP051441345, Section 2, figure 2.2.

* cited by examiner

INDICATION OF SCHEDULING DELAYS FOR A SHARED CHANNEL WITH BWP SWITCHING IN HIGHER FREQUENCY BANDS

CROSS REFERENCE TO RELATED APPLICATION(S)

This application claims the benefit of and priority to U.S. Provisional Application Ser. No. 63/187,332, entitled "SCHEDULING DELAYS WITH BWP SWITCHING" and filed on May 11, 2021; and U.S. Provisional Application Ser. No. 63/187,334, entitled "TIME GAP FOR BWP SWITCHING" and filed on May 11, 2021, which are expressly incorporated by reference herein in their entirety.

TECHNICAL FIELD

The present disclosure relates generally to wireless communication systems, and more particularly, to indication of a scheduling delay for a scheduled shared channel where a bandwidth part (BWP) switch is performed before the shared channel is communicated.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (for example, with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

A base station may configure a bandwidth part (BWP) switch from a first BWP to a second BWP, and may schedule an uplink or downlink shared channel with one or more downlink control information (DCI) messages. A DCI message configuring the BWP switch may be communicated via the first BWP. The base station may include in the one or more DCI messages an indication of a time gap between one of the one or more DCI messages and the transmission or reception of the uplink or downlink shared channel scheduled by the one of the one or more DCI messages. The uplink or downlink shared channel may be transmitted or received in the second BWP. The time gap may be sufficiently long to accommodate a delay associated with the BWP switch. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a base station, an indication of a bandwidth part (BWP) switch from a first BWP to a second BWP. The apparatus may communicate with the base station, via a physical downlink shared channel (PDSCH) or a physical uplink shared channel (PUSCH), in the second BWP based on a time gap. The time gap may be based on at least one of a first time parameter associated with the indication or a second time parameter associated with the BWP switch. The time gap may have a duration that is at least as long as a first duration of a BWP switch delay associated with switching from the first BWP to the second BWP.

In an aspect of the disclosure, a method, a computer-readable medium, and an apparatus are provided. The apparatus may be a base station. The apparatus may transmit, to a UE, an indication of a BWP switch from a first BWP to a second BWP. The apparatus may communicate with the UE, via a PDSCH or a PUSCH, in the second BWP based on a time gap. The time gap may be based on at least one of a first time parameter associated with the indication or a second time parameter associated with the BWP switch. The time gap may have a duration that is at least as long as a first duration of a BWP switch delay associated with switching from the first BWP to the second BWP.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
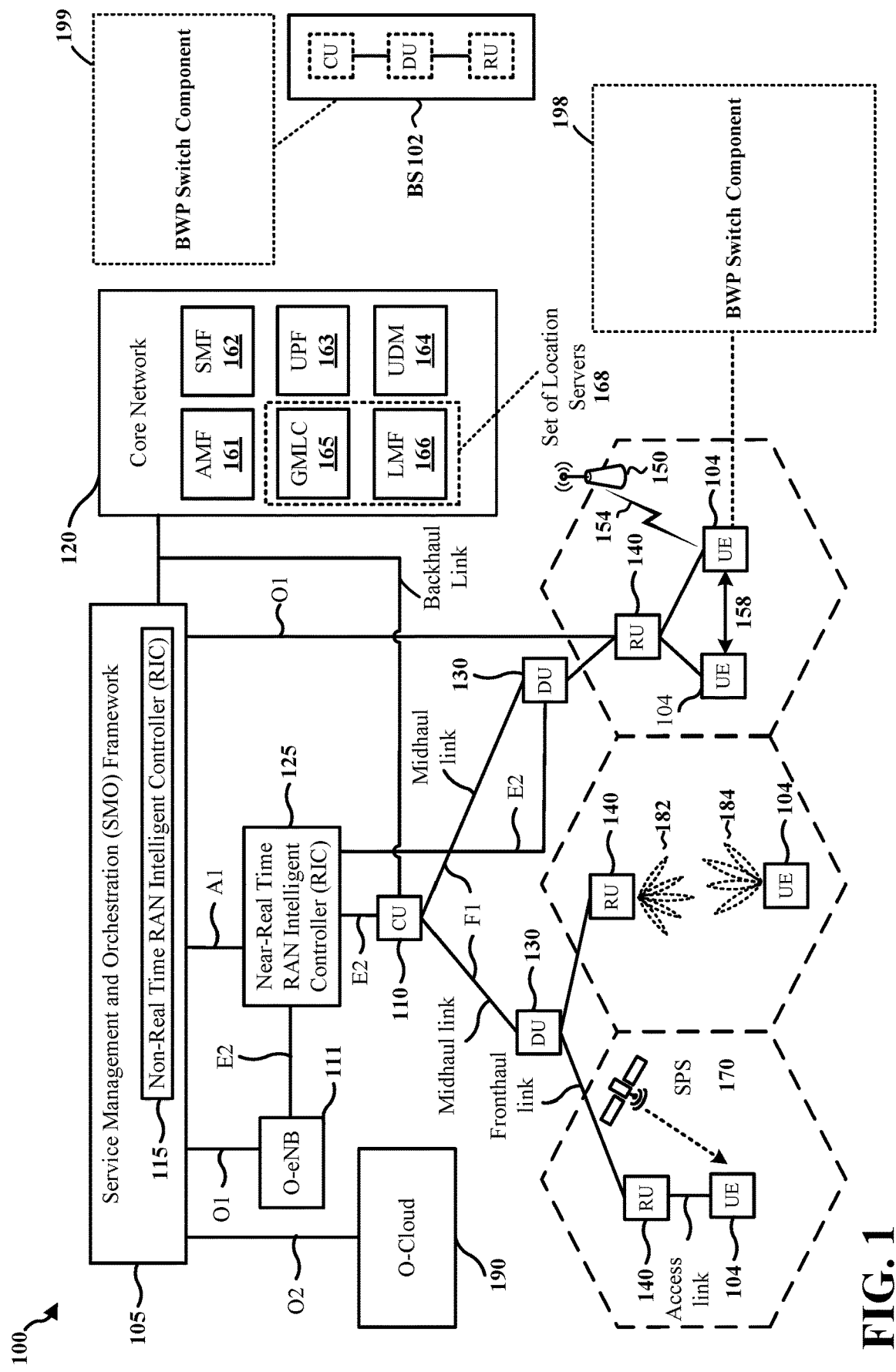
FIG. 1 is a diagram illustrating an example of a wireless communications system and an access network.

A base station may indicate to a UE, a time gap between a downlink control information (DCI) message and the transmission or reception of an uplink or downlink shared channel, respectively, scheduled by the DCI message. The base station may configure, in the same DCI message or in another DCI message close in time to the DCI message, a bandwidth part (BWP) switch, during the time gap, from a first BWP to a second BWP. In some examples, the time gap may be configured to be longer than a BWP switch delay associated with switching from the first BWP to the second BWP. In some wireless communication systems, at least the second BWP is in a higher frequency band (such as FR2-2, FR4, or FR5), where the subcarrier spacing (SCS) is relatively greater and the slot size is relatively shorter than in sub-6 GHz bands. The base station may indicate a time gap using a number indicative of a quantity of slots, where the duration of the time gap may correspond to the total length of the quantity of slots. With a greater SCS and correspondingly a shorter slot size, a time gap similar in duration to one used with a smaller SCS may correspond to a larger quantity of slots. The number indicative of the quantity of slots may become larger as well and the larger number may take more bits for the base station to signal (for example, a decimal numeral in the range between 0 and 31 may take 5 bits to represent, and to represent a decimal numeral greater than 31, more than 5 bits may be needed). The use of more bits to indicate a similar time gap may represent an inefficient use of resources.

Various aspects relate generally to the indication of a scheduling delay for a scheduled shared channel where a BWP switch may be performed before the shared channel is communicated. A scheduling delay between a DCI message scheduling a shared channel and the communication of the share channel may be referred to as a time gap. Some aspects more specifically relate to indicating, by a base station to a UE, a time gap between a DCI message and the transmission or reception of an uplink or downlink shared channel, respectively, scheduled by the DCI message. A time gap between a DCI message scheduling a downlink shared channel and the scheduled downlink shared channel may correspond to a K0 delay, and a time gap between a DCI message scheduling an uplink shared channel and the scheduled uplink shared channel may correspond to a K2 delay. In some aspects, the base station indicates the time gap to the UE based on transmitting an explicitly indicated value (such as a quantity of reference slots) as well as based on one or more of an implicitly indicated offset (such as a delay extension), an implicitly indicated multiplier, an implicit reference SCS, or an SCS associated with the downlink control channel via which the DCI message scheduling the shared channel is transmitted. In some examples, the base station may transmit separate DCI messages for configuring the BWP switch and for scheduling the shared channel, where the base station may time the transmission of the DCI messages such that a time delay between the DCI messages is sufficiently long to accommodate the BWP switch delay. After initiating a BWP switch, the base station or the UE may resume transmission or reception, in the second BWP, after a BWP switch delay associated with the execution of the BWP switch. In some examples, the BWP switch delay may be based on a reference slot size, a bandwidth of one or more of the first BWP or the second BWP, or a frequency difference between the first BWP and the second BWP.

Particular implementations of the subject matter described in this disclosure can be implemented to realize one or more of the following potential advantages. In some implementations, the described techniques can be used to indicate the time gap in a bit width efficient manner. The described techniques may represent a scalable solution for supporting the indication of the time gap associated with a BWP switch in or to a higher frequency band where greater SCSs are used. In some implementations, an indication of the time gap (for example, in terms of a quantity of slots) may be adapted to accommodate the BWP switch delay without increasing the bit width associated with the indication. In some implementations, by defining the time gap based on the reference slot size, the bandwidth, or the frequency difference, the time gap may be different for different situations, improving resource usage efficiency by reducing the time gap in situations where a smaller time gap may be sufficient.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, or use cases are described in this application by illustration to some examples, additional or different aspects, implementations or use cases may come about in many different arrangements and scenarios. Aspects, implementations, or use cases described herein may be implemented across many differing platform types, devices, systems, shapes, sizes, and packaging arrangements. For example, aspects, implementations, or use cases may come about via integrated chip implementations and other non-module-component based devices (for example, end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (for example, hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, that is, a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, that is, the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (that is, Central Unit-User Plane (CU-UP)), control plane functionality (that is, Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 or downlink (DL) (also referred to as forward link) transmissions from an RU 140 to a UE 104. The communication links may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, for example, in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, or FR5, or may be within the EHF band.

The base station 102 and the UE 104 may each include a plurality of antennas, such as antenna elements, antenna panels, or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, or an RU. The set of base stations, which may include disaggregated base stations or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (for example, emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 or the serving base station 102. The signals measured may be based on one or more of a satellite positioning system (SPS) 170 (for example, one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (for example, barometric pressure sensor, motion sensor), NR enhanced cell ID (NR E-CID) methods, NR signals (for example, multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network or individually access the network.

Referring again to FIG. 1, in some aspects, the UE 104 may include a BWP switch component 198 that may be configured to receive, from a base station, an indication of a BWP switch from a first BWP to a second BWP. The BWP switch component 198 may be configured to communicate with the base station, via a PDSCH or a PUSCH, in the second BWP based on a time gap. The time gap may be based on at least one of a first time parameter associated with the indication or a second time parameter associated with the BWP switch. The time gap may have a duration that is at least as long as a first duration of a BWP switch delay associated with switching from the first BWP to the second BWP. In some aspects, the base station 102 may include a BWP switch component 199 that may be configured to transmit, to a UE, an indication of a BWP switch from a first BWP to a second BWP. The BWP switch component 199 may be configured to communicate with the UE, via a PDSCH or a PUSCH, in the second BWP based on a time gap. The time gap may be based on at least one of a first time parameter associated with the indication or a second time parameter associated with the BWP switch. The time gap may have a duration that is at least as long as a first duration of a BWP switch delay associated with switching from the first BWP to the second BWP. Although the following description may be focused on 5G NR, the concepts described herein may be applicable to other similar areas, such as LTE, LTE-A, CDMA, GSM, and other wireless technologies.

Figure 2:
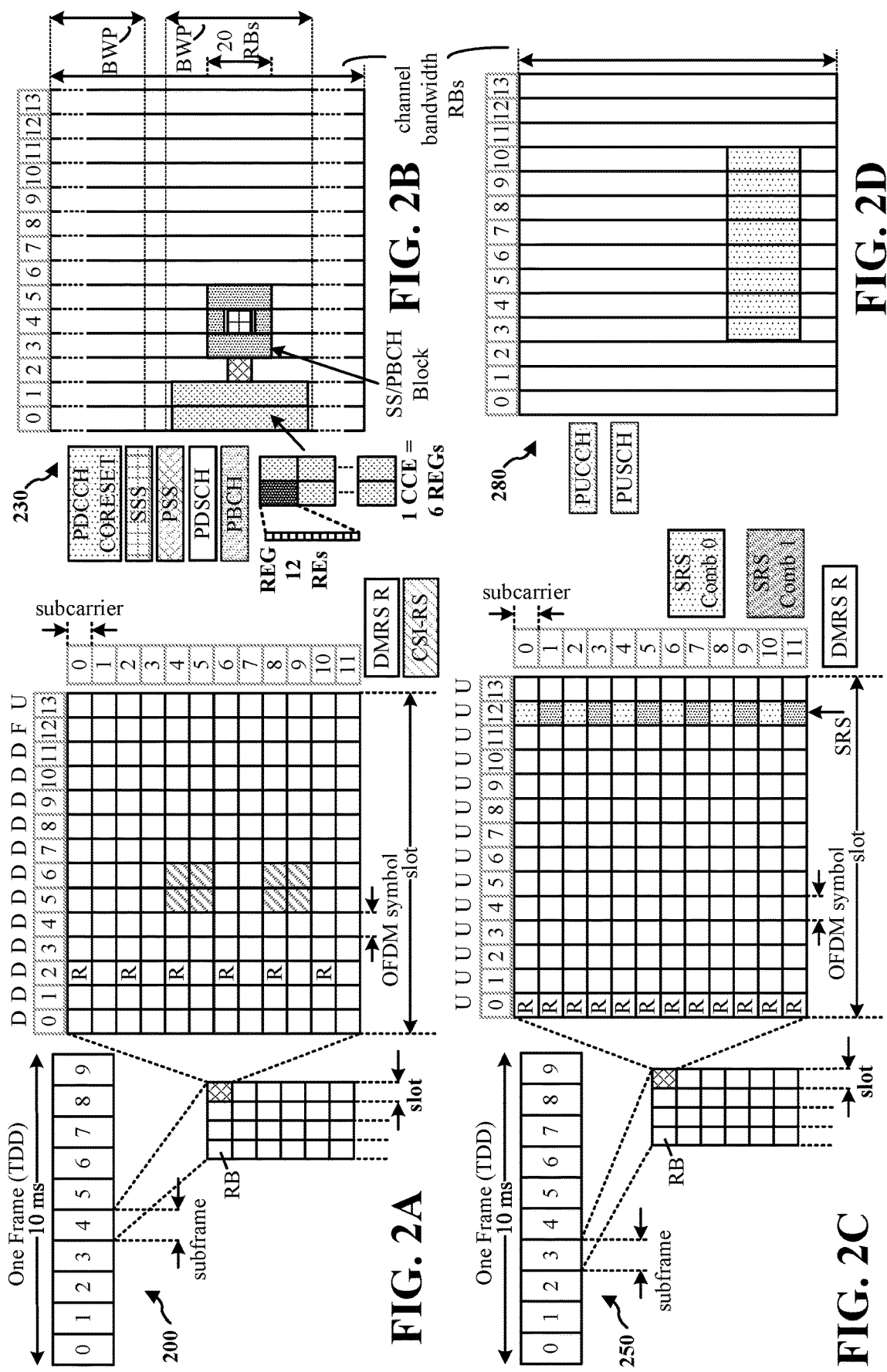
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

| μ | SCS $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (for example, 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (for example, common search space, UE-specific search space) during PDCCH monitoring occasions on the CORESET, where the PDCCH candidates have different DCI formats and different aggregation levels. Additional BWPs may be located at greater or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (that is, one or more HARQ ACK bits indicating one or more ACK or negative ACK (NACK)). The PUSCH carries data, and may additionally be used to carry a buffer status report (BSR), a power headroom report (PHR), or UCI.

Figure 3:
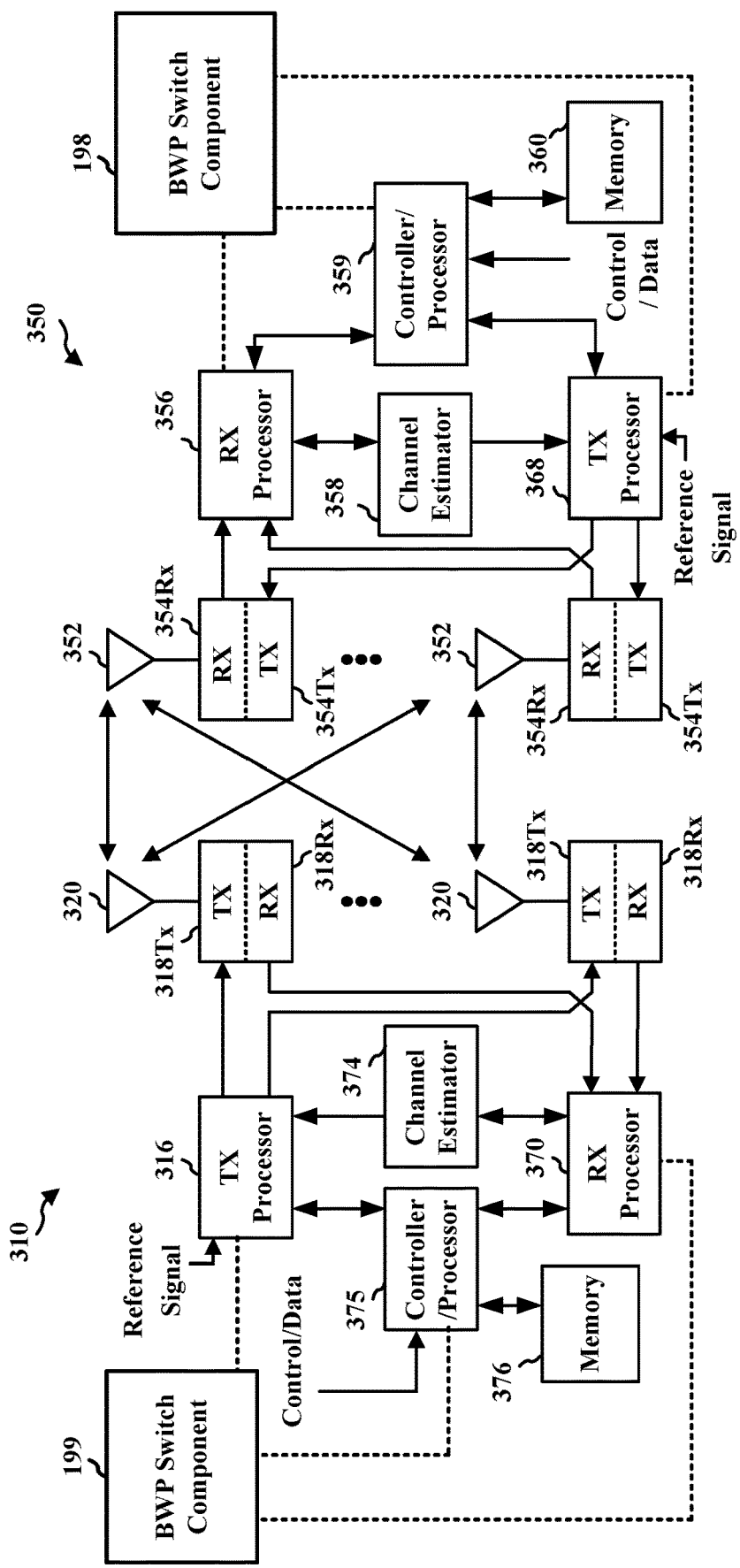
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (for example, MIB, SIBs), RRC connection control (for example, RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (for example, binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (for example, pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK or NACK protocol to support HARQ operations.

At least one of the TX processor 368, the RX processor 356, and the controller/processor 359 may be configured to perform aspects in connection with the BWP switch component 198 of FIG. 1.

At least one of the TX processor 316, the RX processor 370, and the controller/processor 375 may be configured to perform aspects in connection with the BWP switch component 199 of FIG. 1.

In higher frequency bands, such as a frequency band above 52.6 GHz, there may be added phase noise or a wider available bandwidth for wireless communication. A higher SCS may be used for the wireless communication in such higher frequency bands, for example to reduce phase noise or to utilize the wider available bandwidth. A higher SCS corresponds to a shorter symbol and slot duration. As described in connection with the example in Table 1 and FIGS. 2A-2D, a SCS is based on a numerology with the symbol length/duration being equal to 1/SCS. For example, a SCS of 120 kHz, 240 kHz, 480 kHz, or 960 kHz may be used for wireless communication in a frequency band above 52.6 GHz.

In some aspects, a bandwidth may be indicated for communication in a frequency range above 52.6 GHz for data and control channels or for reference signals. In some aspects, the wireless communication and SCS may be based on a normal CP, such as described in connection with Table 1 and FIGS. 2A-2D. A common design framework may be applied for the different SCS, including 480 kHz to 960 kHz, and having different timing aspects due to the different symbol length. A SCS of 120 kHz may be used for transmission of an SSB, with up to 64 SSB beams being used for licensed or unlicensed wireless communication in a frequency range above 52.6 GHz, for example. An example of an SSB is described in connection with FIG. 2B. In some aspects, one or more additional SCSs, such as 240 kHz, 480 kHz, or 960 kHz, may be used for the transmission of SSBs or for other initial access related signals and channels in an initial BWP. In some aspects, PRACH sequence lengths (L), such as L=139, L=571, or L=1151) may be supported, and random access channel occasions (ROs) may be configured to be non-consecutive in a time domain to provide for other wireless communication in a shared frequency spectrum.

A BWP, which may also be referred to as a carrier BWP, Bandwidth Part includes a contiguous set of physical resource blocks (PRBs), selected from a contiguous subset of the common resource blocks for a given numerology on a given frequency carrier.

Figure 4:
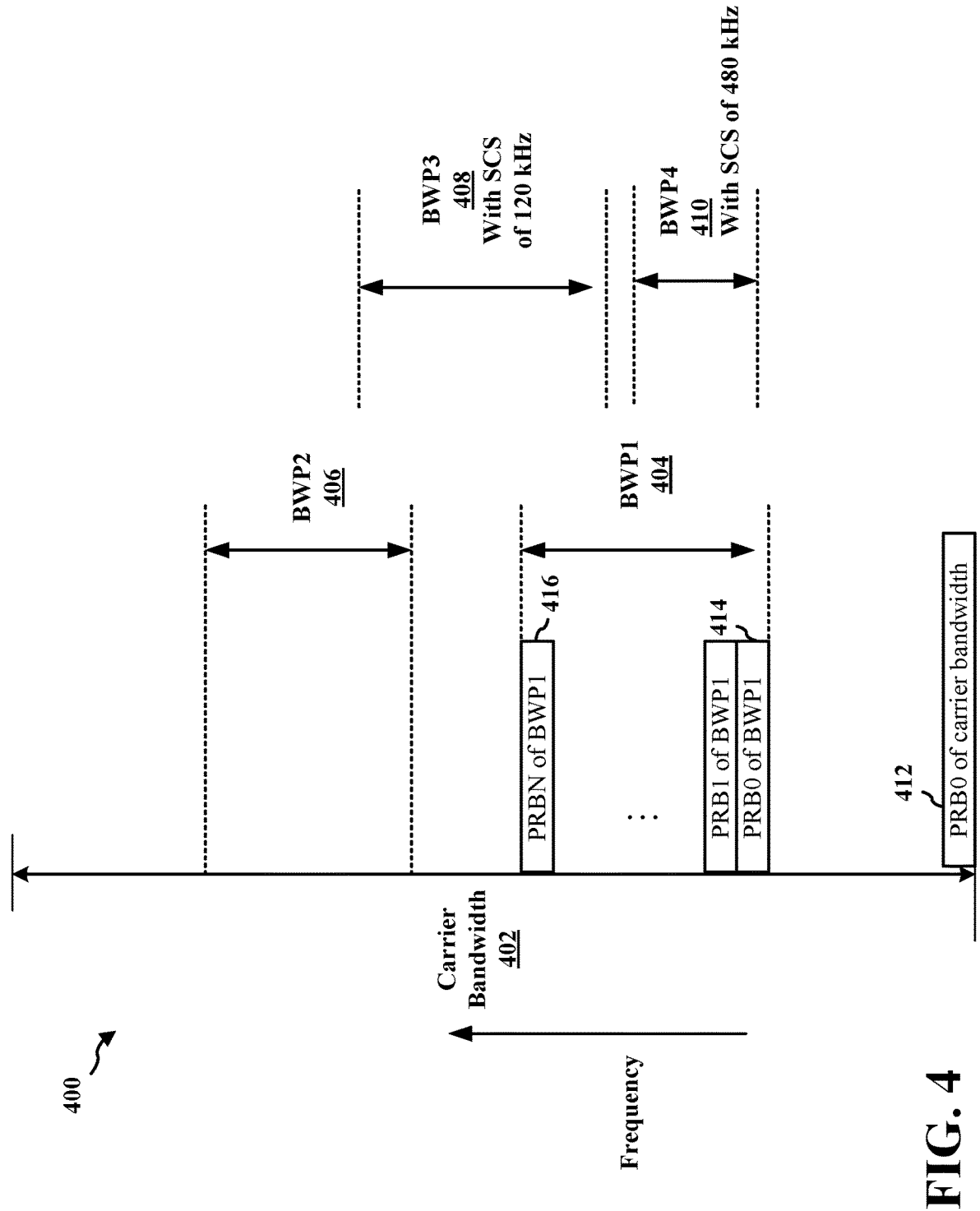
FIG. 4 illustrates a frequency diagram showing examples of multiple bandwidth parts (BWPs).

FIG. 4 illustrates a frequency diagram 400 showing examples of multiple BWPs. FIG. 4 illustrates carrier bandwidth 402 and multiple BWPs, including BWP1 404, BWP2 406, BWP3 408, and BWP4 410, that correspond to a subset of the carrier bandwidth. The PRBs of the carrier bandwidth 402 may be numbered from a reference PRB, such as the example of PRB0 412, as a common reference point for the BWPs relative to the carrier bandwidth. Each BWP may be based on an offset between the common reference point, for example, PRB0 412 and a reference point of the particular BWP. Each BWP may span a frequency corresponding to one or more PRBs. For example, FIG. 4 illustrates BWP1 404 spanning PRB0 414 to PRBN 416. Different BWPs may be based on different SCSs. For example, BWP3 408 is illustrated in FIG. 4 as having a 120 kHz SCS, and BWP4 is illustrated as having a 480 kHz SCS.

A UE is not expected to receive PDSCH, PDCCH, CSI-RS, or a tracking reference signal (TRS) outside of an active downlink bandwidth part. Each downlink BWP may include at least one control resource set (CORESET) with a UE specific search space. At least one of the BWPs may include a CORESET with a common search space. A UE may not transmit PUSCH or PUCCH outside of an active uplink BWP.

A UE may receive a configuration for multiple BWPs, and one BWP may be active for the UE at a given time. The UE may switch the active BWP between different BWPs configured for the UE. The BWP switch may be triggered in any of various ways, including downlink control signaling activating a BWP, expiration of an inactivity timer, RRC signaling, initiation by a MAC entity, among other possible examples.

There may be a delay for a UE to switch between BWPs. Table 2 illustrates a set of example BWP switch delay times ($T_{BWPswitchDelay}$) in a number of slots. The BWP switch delay time may provide a time for the UE to switch between transmission or reception in one BWP to transmission or reception in a different BWP for different numerologies (u).

TABLE 2

| u | Slot length (ms) | BWP switch delay $T_{BWPswitchDelay}$ (slots) | |
|---|---|---|---|
| | | Type 1 | Type 2 |
| 0 | 1 | 1 | 3 |
| 1 | 0.5 | 2 | 5 |

TABLE 2-continued

| u | Slot length (ms) | BWP switch delay $T_{BWPswitchDelay}$ (slots) | |
|---|---|---|---|
| | | Type 1 | Type 2 |
| 2 | 0.25 | 3 | 9 |
| 3 | 0.125 | 6 | 18 |

The time for the Type 1 delay may depend on a UE capability. If the BWP switch involves changing SCS, the BWP switch delay may be determined by the smaller SCS between the SCS before BWP switch and the SCS after BWP switch. The BWP switch delay in Table 2 may be for a BWP switch indicated to the UE in DCI from a base station. In some aspects, an SCS change may be considered a BWP switch. That is, the SCS change may cause a BWP switch. A BWP switch, or change in SCS, may include an SCS change between any of 120 kHz, 240 kHz, 480 kHz, and 960 kHz. If the BWP switch delay is based on a length in time relative to the slot length of the smaller SCS, the length may cover an increased number of slots in the larger SCS. For example, there is a ratio of 2 between a slot length for 60 kHz and 120 kHz. For higher frequency bands having a SCS of 480 kHz or 960 kHz, the ratio becomes larger. For example, if the BWP switch involves a SCS change between 120 kHz and 960 kHz, the ratio of slot sizes is 8. If the switching gap is based on the smaller SCS, the switching gap can correspond to an increased number of slots for the larger SCS. The unused slots for the larger SCS can lead to delays and reduced use of wireless resources. For example, the BWP switch delay for a BWP at 960 kHz may be less than ⅛ of the length in time for a BWP switch delay at 120 kHz.

The bandwidth difference between the BWPs involved in a BWP switch may have different sizes, with the UE using less time to switch between BWPs having a smaller difference. In higher frequency bands, such as above 52.6 GHz, the UE may switch between BWPs at larger distances, such as from a 120 kHz SCS with 100 MHz to 2 GHz in a 960 kHz SCS, or from 120 kHz SCS with 400 MHz to 800 MHz in a 960 kHz SCS. The BWP switching delay experienced by the UE may be based on a bandwidth of the BWPs involved in the BWP switch, alternative to or in addition to dependence on SCS. With a wider frequency range, such as up to 2 GHz, the BWP switch may be performed over a larger range of frequencies. The various frequencies within the larger range may lead to different amounts of time for the UE to perform the BWP switch and prepare to transmit or receive in the new BWP.

Figure 5:
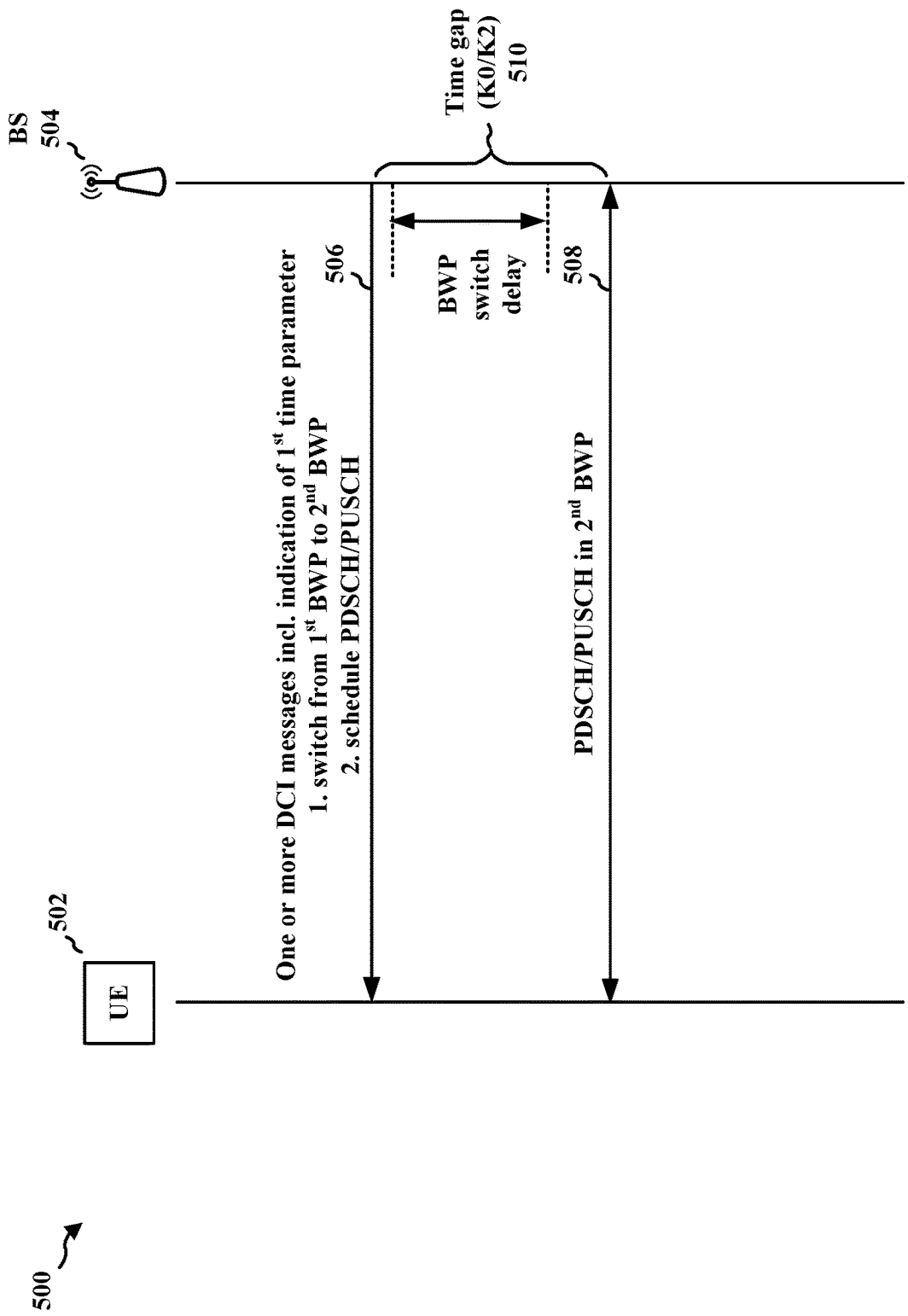
FIG. 5 is a flow diagram illustrating an example shared channel scheduling procedure between a base station and a UE that supports BWP switching in accordance with aspects of the present disclosure.

FIG. 5 is a flow diagram illustrating an example shared channel scheduling procedure 500 between a base station and a UE that supports BWP switching in accordance with aspects of the present disclosure. The UE 502 may correspond to the UE 104 or 350. The base station 504 may correspond to the base station 102, or 310. At 506, the base station 504 may transmit to the UE 502, and the UE 502 may receive from the base station 504, one or more DCI messages. The one or more DCI messages may indicate a BWP switch from a first BWP to a second BWP and may schedule one of a PDSCH or a PUSCH. The one or more DCI messages may further indicate a first time parameter. At 508, the UE 502 and the base station 504 may communicate via the scheduled one of the PDSCH or the PUSCH in the second BWP after a time gap 510. The time gap 510 may be based on at least one of the first time parameter or a second time parameter associated with the BWP switch.

In this example, a BWP switch may include an SCS switch. In some aspects, the one or more DCI messages may schedule a PDSCH, and the time gap may correspond to a K0 delay. In some aspects, the one or more DCI messages may schedule a PUSCH, and the time gap may correspond to a K2 delay.

For higher frequency bands, the SCS may be larger, and the slot size/length may be correspondingly shorter. For example, the slot length associated with the 480 kHz SCS and the 960 kHz SCS may be 31.25 µs and 15.625 µs, respectively. In some aspects, the K0 delay or the K2 delay may be indicated in the DCI message in terms of a quantity of slots each having a length of a slot associated with the PDSCH or the PUSCH, and the configurable value for the K0 delay or the K2 delay may be 32 slots or fewer. A total length of 32 slots may correspond to 1 ms and 0.5 ms for the 480 kHz SCS and the 960 kHz SCS, respectively. Therefore, in these higher frequency bands, the range for the K0 delay or the K2 delay that is 32 or fewer slots may be shorter than the BWP switch delay (also referred to as the BWP switching gap), which may be 1-3 ms, as described above. Therefore, the present application provides techniques for indicating the K0 delay or the K2 delay in higher frequency bands that may accommodate the BWP switch delay.

In some aspects, the K0 delay or the K2 delay may be indicated in terms of a larger quantity of slots (each slot having a length associated with the PDSCH or the PUSCH) based on an extension of a configurable value (which may be referred to as a maximum configurable value) for the K0 delay or the K2 delay. For example, instead of 32 slots, the configurable value may be 64 slots. The base station may indicate the larger configurable value for the K0 or K2 delay with an increased number of bits in the control signaling to the UE. Accordingly, the bit width of the indication of the K0 delay or the K2 delay in a single DCI message may be increased.

In some aspects, the base station 504 may transmit a single DCI message 506 to the UE 502 that indicates a BWP switch and schedules the PDSCH or the PUSCH 508 for the UE 502. A first time parameter associated with the PDSCH or the PUSCH may correspond to the indicated K0 delay or the K2 delay between the DCI message 506 scheduling the PDSCH or the PUSCH and the slot in which the PDSCH or the PUSCH 508 is scheduled to be transmitted/received. The second time parameter may correspond to a second time delay, which may correspond to the BWP switch delay. The base station 504 may indicate a K0 delay or the K2 delay that is longer than the second delay. With the extended configurable value (for example, being greater than 32) for the K0 delay or the K2 delay, the base station 504 may transmit a single DCI message indicating the first time delay via a first quantity of bits that is greater than a second quantity of bits associated with indicating a K0 delay or a K2 delay that is limited to a configurable value of 32. The added length of the K0 or K2 value may provide time for a BWP switch in or to a higher frequency band, for example.

This additional bit approach may be less scalable for future SCS increases, such as SCS increases beyond 960 kHz.

Some aspects presented herein may relate to approaches for indicating the K0 delay or the K2 delay that are scalable for future SCS increases and are not associated with additional signaling bits.

In one aspect, the base station 504 may transmit an indication for the value K0 or K2 to the UE 502 in terms of a quantity of slots each having a length of a slot associated with the PDSCH or the PUSCH 508. The configurable value for the indication may be 32 or fewer slots. However, if the UE 502 switches a BWP, the UE may add a numerology-dependent time offset to the K0 or K2 value signaled by the base station. The numerology-dependent offset may be based on the numerology of the PDSCH or the PUSCH. In other words, the actual time delay between the DCI and the PDSCH or the PUSCH may be a sum of the indicated K0 or K2 delay value (which may be indicated in terms of a quantity of slots each having a length of a slot associated with the PDSCH or the PUSCH) and the numerology-dependent offset. The UE 502 and the base station 504 may add the numerology-dependent offset to the delay based on the signaled K0 or K2 value based on the UE 502 switching BWPs to transmit or receive the PDSCH or the PUSCH 508. The numerology-dependent offset may be in terms of a quantity of slots (having lengths that are each associated with the BWP either before or after the BWP switch), or an absolute length of time. The numerology-dependent offset may be longer for the higher SCSs. For example, the numerology-dependent offset for a 240 kHz SCS may be smaller than the numerology-dependent offset for a 480 kHz SCS.

Therefore, in some aspects, the one or more DCI messages 506 may be a single DCI message. A first time parameter associated with the PDSCH or the PUSCH may correspond to the indicated K0 delay or the K2 delay between the DCI message 506 scheduling the PDSCH or the PUSCH and the slot in which the PDSCH or the PUSCH 508 is scheduled to be transmitted/received. A second time parameter may be based on the numerology-dependent offset, which may correspond to a number of slots having lengths that are each associated with either the first BWP or the second BWP, or an absolute length of time. The actual time delay between the DCI message 506 and the PUSCH or the PDSCH 508 may include a sum of the first time delay (such as the signaled K0 delay or the K2 delay) and the numerology-dependent offset.

In one aspect, the base station 504 may transmit a separate DCI message to indicate the BWP switch to the UE 502, such as a separate DCI message than the DCI message that schedules the PDSCH or the PUSCH 508. After transmitting the DCI message for the BWP switch, the base station 504 may wait for a time lapse that may accommodate the BWP switch delay before transmitting the DCI message 506 for scheduling the PDSCH or the PUSCH 508. In this case, the K0 delay or the K2 delay indicated in the DCI message 506 for scheduling the PDSCH or the PUSCH 508 may be independent of the BWP switch delay, and the K0 delay or the K2 delay may be based on a configurable value that is 32 or fewer.

Therefore, the second time parameter may correspond to a second delay, which may correspond to the BWP switch delay. The one or more DCI messages may include a first DCI message indicating the BWP switch from the first BWP to the second BWP and a second DCI message scheduling the one of the PDSCH or the PUSCH 508. A time lapse between the first DCI message and the second DCI message may be at least as long as the second time delay associated with the BWP switch from the first BWP to the second BWP.

In one aspect, the base station 504 may transmit a DCI message 506 that includes an indication of a K0 or K2 delay (which may be indicated in terms of a quantity of slots each having a length of a slot associated with the PDSCH or the PUSCH), and the UE 502 may interpret the K0 or the K2 value differently based on whether the UE will switch a BWP. The configurable value for the K0 or the K2 value may continue to be 32 or fewer, for example. If the UE will switch BWPs, the UE may multiply the indicated K0 or K2 value by a number larger than one. In other words, the actual time delay between the DCI message 506 and the PDSCH or the PUSCH 508 may be based on a product of the signaled delay (such as the K0 or K2 value in terms of a quantity of slots each having a length of a slot associated with the PDSCH or the PUSCH) and a multiplier. For example, if a 2× multiplier is used, a K0 or K2 delay of 32 slots may be multiplied by 2 to become a delay of 64 slots between the DCI message 506 and the PDSCH or the PUSCH 508. The multiplier may also be referred to as a slot resolution, a slot interpretation, a slot factor, and so on. The multiplier value may be based on the PDSCH SCS or the PUSCH SCS. The multiplier value may be higher for larger SCSs. The use of the multiplier may provide for a longer delay between DCI scheduling PDSCH or PUSCH with a BWP switch. The longer delay may accommodate a larger number of slots at a higher SCS without an added number of bits to signal the larger number of slots in the DCI.

Therefore, the first time parameter may correspond to the delay value signaled by the base station 504 (such as the K0 or K2 value indicated in the DCI message 506) in terms of a quantity of slots each having a length of a slot associated with the PDSCH or the PUSCH. The second time parameter may correspond to the multiplier associated with a particular SCS or with a BWP. The actual K0 delay or the K2 delay may include a product of the first time delay and the multiplier.

In one aspect, the base station 504 may transmit an indication of the K0 or the K2 delay that indicates a time between the DCI message 506 and the PDSCH or the PUSCH 508 in terms of a quantity of slots each having a length of a reference slot (instead of a slot size associated with the PDSCH or the PUSCH). The reference slot length/size may be based on a rule or may be known to the UE 502 and the base station 504. The reference slot may be associated with a reference SCS. As one, non-limiting example, the reference slot may be a 120 kHz reference SCS slot length. The configurable value for the indication may be 32 or fewer. For example, an indication of a delay of 32 slots may indicate a K0 delay or a K2 delay of 32 slots having lengths that are each associated with a 120 kHz SCS reference slot. Accordingly, the BWP switch delay may be accommodated in the K0 delay or K2 delay based on the use of the reference slot size. The reference slot size may be used to provide a delay between the DCI and the scheduled PDSCH or the PUSCH at higher SCSs that is longer than 32 slots without an increase in the number of bits to signal the delay.

Therefore, the first time parameter may correspond to the quantity of slots that the base station 504 indicates in the DCI message 506. The second time parameter may correspond to the reference slot size. The actual K0 delay or K2 delay may be based on the first time parameter and the reference slot size. In particular, the actual K0 delay or K2 delay may include a total length of the indicated quantity of reference slots having lengths that are each associated with the reference SCS.

In one aspect, an indication of the delay may be in terms of a quantity of slots that are each associated with the numerology of the PDCCH via which the DCI message scheduling the PDSCH or the PUSCH (instead of the numerology of the PDSCH or the PUSCH) is transmitted and received.

Therefore, the one or more DCI messages 506 may consist of a single DCI message. The first time parameter may correspond to the indicated quantity of slots, that is, a first quantity of slots. The second time parameter may be based on the numerology of the PDCCH via which the single DCI message is transmitted and received. The numerology of the PDCCH may be different than a numerology for the PDSCH or the PUSCH. The actual K0 delay or K2 delay may be based on the first time parameter corresponding to the first quantity of slots and the numerology of the PDCCH.

Figure 6:
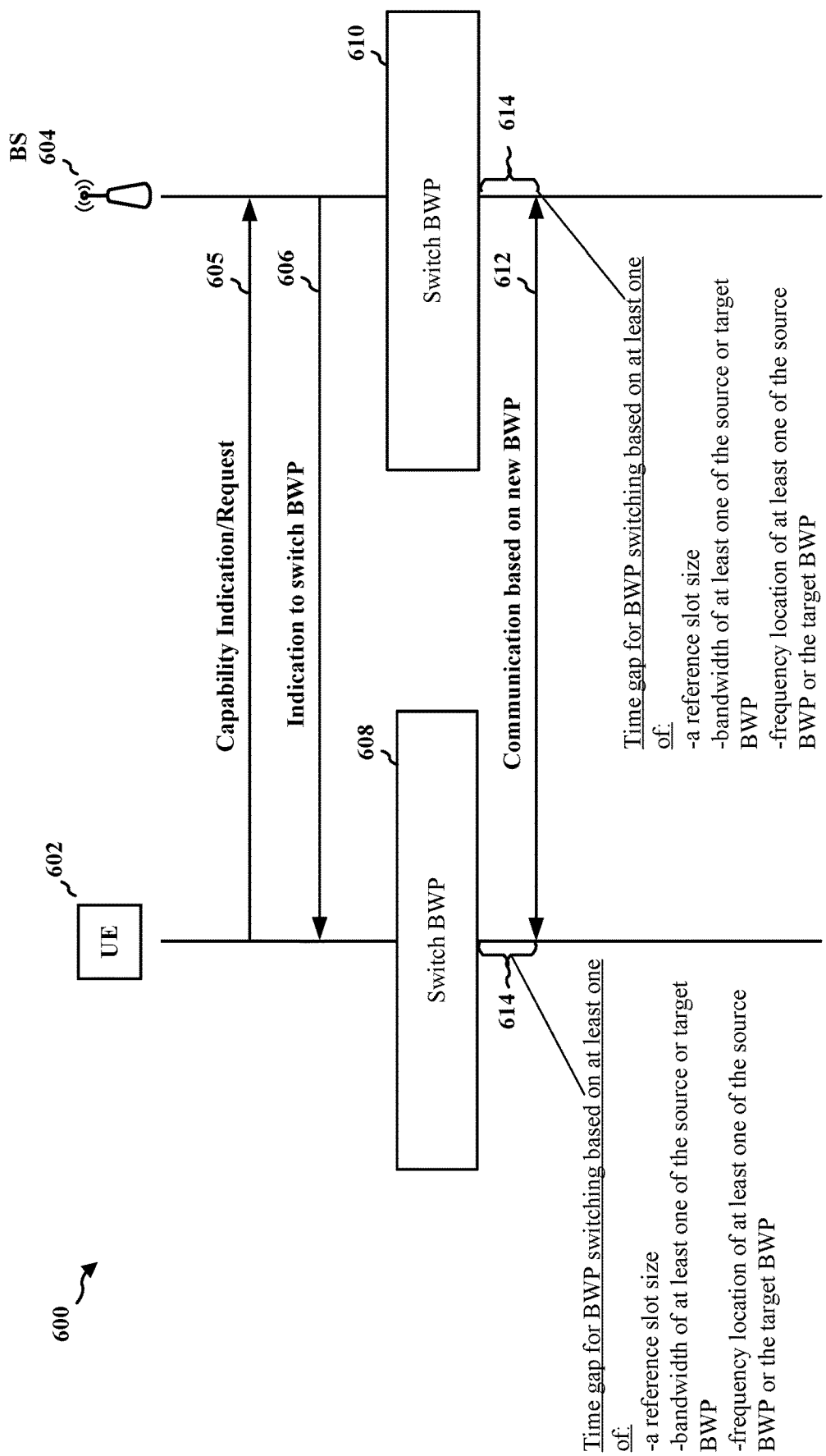
FIG. 6 is a flow diagram illustrating example communications between a base station and a UE that supports BWP switching in accordance with aspects of the present disclosure.

FIG. 6 is a flow diagram 600 illustrating example communications between a base station 604 and a UE 602 that supports BWP switching in accordance with aspects of the present disclosure. As illustrated in FIG. 6, the base station 604 may transmit an indication to switch BWP 606 to the UE 602. The UE 602 receives an indication 606 to switch BWPs. The indication may be received in DCI transmitted by the base station 604. After receiving the indication to switch BWP 606, the UE 602 may switch from a first BWP (which may be referred to as a "source BWP") to a second BWP (which may be referred to as a "target BWP") at block 608. The base station 604 may also switch from a first BWP to a second BWP at block 610. The UE may take time to switch from transmission or reception on the source BWP to transmission or reception on the second BWP. A BWP switching delay, which is also referred to herein as a time gap for BWP switching, may be provided before the transmission or the reception on the target BWP. In some aspects, after a time gap 614 for BWP switching (the time gap 614 may also be referred to as the BWP switch delay), the UE 602 and the base station 604 may transmit or receive communication 612 based on the new BWP (which is the target BWP).

In some aspects, the time gap 614 for BWP switching may be based on a reference slot size, such as being a number of lengths of the reference slot size. The reference slot may be based on a particular SCS. As one example, the reference slot size may be based on a slot having a 120 kHz SCS. The use of a reference slot size provides for a more stable time gap for BWP switching, the length in time being the same independent of the particular SCS of the BWPs involved in the switch. As another example, the reference slot size may be based on a slot having a larger SCS. The SCS which the time gap 614 for BWP switching may be based on may be a specific SCS, such as an SCS described in connection with Table 1. In some aspects, the slot size may be based on a function of the SCS for the source BWP or the target BWP. As an example the SCS for the reference slot may be based on an average of the SCS for the source BWP and the target BWP. As another example, the SCS for the reference slot may be based on a product of the SCS for the smaller of source BWP and the target BWP multiplied by a value. As an example the product may be 1.5*the smaller SCS. As another example, the SCS for the reference slot may be based on a product of the SCS for the larger of source BWP and the target BWP multiplied by a value. As an example, the product may be 0.5*the larger SCS. As another example, the SCS for the reference slot may be based on 0.5*a difference between the SCS of the source BWP and a SCS of the target BWP. The concept is not limited to these examples of functions, and the reference slot size may be based on another function of the SCS for the source BWP or the target BWP.

In some aspects, the time gap 614 for BWP switching may be based on a bandwidth of at least one of the source BWP or the target BWP. For example, the time gap 614 for BWP switching may be based on the actual bandwidth (in Hz) of the source BWP. The time gap for BWP switching may be based on the actual bandwidth of the target BWP. In some aspects, the time gap 614 for BWP switching may be based on a ratio between the bandwidth of the source BWP and the bandwidth of the target BWP.

In some aspects, the time gap 614 for BWP switching may be based on a frequency location delta (in other words, a frequency difference) between the source BWP and the target BWP. For example, the frequency location delta may be a delta (in other words, difference or offset) between the source BWP and the target BWP. The delta may be based on a starting RB of the source BWP and a starting RB of the target BWP. The delta may be based on an ending (or highest) RB of the source BWP and an ending RB of the target BWP. The delta may be based on a different reference point for the BWPs, such as a difference in frequency between a center RB for the two BWPs, or another reference point between the BWPs.

In some aspects, the parameters on which the time gap 614 for BWP switching may be based on, such as a reference slot size, the BWP frequency location delta, or the actual bandwidth or the ratio of the source BWP or the target BWP, may be based on a rule or otherwise specified and known in advance by the UE 602. In some aspects, the base station 604 may indicate to the UE 602 the criteria to use for the time gap 614 for BWP switching. For example, the base station 604 may transmit the indication 606 to the UE instructing the UE 602 to use a particular criteria (for example, a reference slot size, a bandwidth of the source or target BWP, or a frequency location delta between the source and target BWP). In some aspects, the indication 606 may be based on a request or on capability information transmitted from the UE 602. For example, the UE 602 may transmit a capability indication or request 605 to the base station 604 indicating support for a time gap for BWP switching capability. Additionally, or alternatively, the UE may transmit a request for a time gap for BWP switching criteria that is selected by the UE 602.

Based on the capability indication or request 605, the time gap for BWP switching criteria may be determined by the base station 604 or the UE 602.

Similar to the description of the time gap 614 for BWP switching that the UE observes before transmitting or receiving communication 612 following a BWP switch, at 608, the base station 604 may similarly wait to transmit or receive the communication 612 with the UE until after the time gap 614 for BWP switching. As illustrated at block 610, the base station may switch BWPs for the transmission or reception of the communication 612 with the UE 602.

In some examples, the base station 604 may transmit the SCS of the reference slot, the BWP frequency location delta, or the actual bandwidth or the ratio of the source BWP or the target BWP, to the UE 602 in the indication to switch BWP 606 or another communication. In some aspects, the base station 604 and the UE 602 may determine the time gap 614 for BWP switching based on specified parameters such as specified SCS of the reference slot, specified BWP frequency location delta, or specified actual bandwidth or the ratio of the source BWP or the target BWP. Such specified parameters may be configured on the base station 604 or the UE 602 independent of signaling between the base station 604 and the UE 602.

Figure 7:
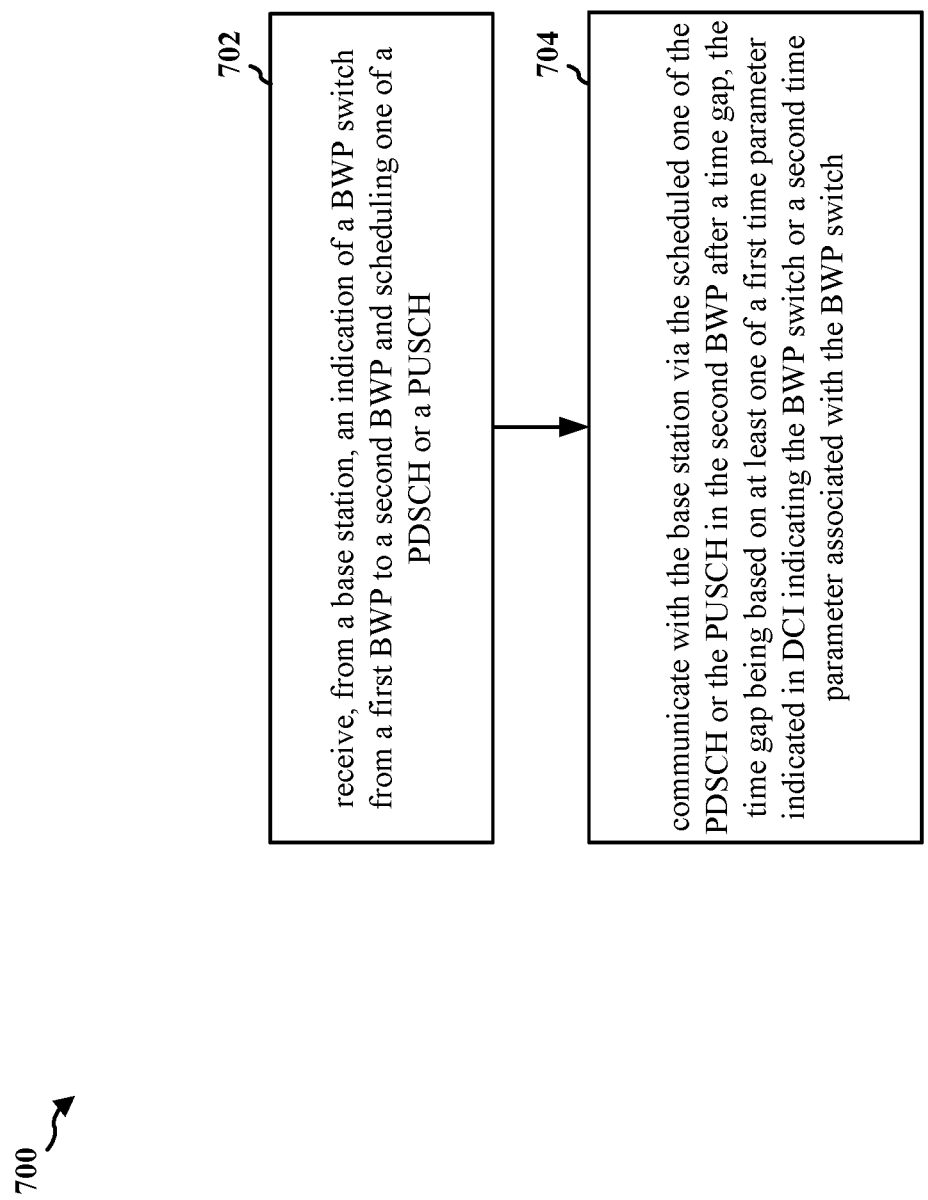
FIG. 7 is a flowchart illustrating a method of wireless communication performed by a UE that supports BWP switching in accordance with some aspects of the present disclosure.

FIG. 7 is a flowchart illustrating a method of wireless communication 700 performed by a UE that supports BWP switching in accordance with aspects of the present disclosure. The method may be performed by a UE (such as the UE 104, 350, 502, or 602; or the apparatus 904). In block 702, the UE may receive, from a base station, an indication of a BWP switch from a first BWP to a second BWP and scheduling one of a PDSCH or a PUSCH. For example, block 702 may be performed by the component 198 in FIG. 9. Referring to FIGS. 5 and 6, at 506 or 606, the UE 502/602 may receive, from a base station 504/604, an indication of a BWP switch from a first BWP to a second BWP and scheduling one of a PDSCH or a PUSCH.

In block 704, the UE may communicate with the base station via the scheduled one of the PDSCH or the PUSCH in the second BWP after a time gap. The time gap 510 may be based on at least one of a first time parameter indicated in DCI indicating the BWP switch or a second time parameter associated with the BWP switch. The time gap may have a duration that is at least as long as a duration of a BWP switch delay associated with switching from the first BWP to the second BWP. For example, block 704 may be performed by the component 198 in FIG. 9. Referring to FIGS. 5 and 6, at 508 or 612, the UE 502/602 may communicate with the base station 504/604 via the scheduled one of the PDSCH or the PUSCH in the second BWP after a time gap 510. The time gap 510 may be based on at least one of a first time parameter indicated in DCI indicating the BWP switch or a second time parameter associated with the BWP switch.

In one configuration, the BWP switch may include a switch from a first SCS to a second SCS.

In one configuration, the indication may be included in one or more DCI messages. The one or more DCI messages may schedule the PDSCH, and the time gap may correspond to a K0 delay.

In one configuration, the indication may be included in one or more DCI messages. The one or more DCI messages may schedule the PUSCH, and the time gap may correspond to a K2 delay.

In one configuration, the indication may be included in one or more DCI messages. The first time parameter may correspond to a first time delay. The second time parameter may correspond to a second time delay. The one or more DCI messages may consist of a single DCI message that indicates the BWP switch and the first time delay. The first time delay may be at least as long as the second time delay.

In one configuration, the single DCI message may indicate the first time delay via a first quantity of bits that is greater than a second quantity of bits associated with indicating a K0 delay or a K2 delay without a BWP switch.

In one configuration, the indication may be included in one or more DCI messages. The first time parameter may correspond to a first time delay. The second time parameter may correspond to a second time delay. The one or more DCI messages may consist of a single DCI message that indicates the BWP switch and the first time delay. The first time delay may correspond to a first quantity of slots having lengths that are each associated with either the first BWP or the second BWP. The time gap may further include the second time delay based on a numerology-dependent offset.

In one configuration, the numerology-dependent offset may correspond to a number of slots having lengths that are each associated with either the first BWP or the second BWP, or an absolute length of time.

In one configuration, the time gap between the single DCI message and the scheduled one of the PDSCH or the PUSCH may include a sum of the first time delay and the numerology-dependent offset.

In one configuration, the indication may be included in one or more DCI messages. The second time parameter may correspond to a second time delay. The one or more DCI messages may include a first DCI message indicating the BWP switch from the first BWP to the second BWP and a second DCI message scheduling the one of the PDSCH or the PUSCH. A time lapse between the first DCI message and the second DCI message may be at least as long as the second time delay associated with the BWP switch from the first BWP to the second BWP.

In one configuration, the first time parameter may correspond to a first time delay. The second time parameter may correspond to a multiplier associated with a SCS for the scheduled one of the PDSCH or the PUSCH. The time gap may include a product of a total length of the first time delay and the multiplier.

In one configuration, the first time parameter may correspond to a first quantity of slots. The second time parameter may correspond to a reference slot size. The time gap may be based on the first time parameter corresponding to the first quantity of slots and the reference slot size.

In one configuration, the first time parameter may correspond to a first quantity of slots. The time gap may include a total length of the first quantity of reference slots having lengths that are each associated with a reference SCS.

In one configuration, the indication may be included in one or more DCI messages. The one or more DCI messages may consist of a single DCI message. The first time parameter may correspond to a first quantity of slots. The second time parameter may be based on a numerology of a PDCCH via which the single DCI message is received. The time gap may be based on the first time parameter corresponding to the first quantity of slots and the numerology of the PDCCH.

In one configuration, the numerology of the PDCCH may be different than a numerology for the scheduled one of the PDSCH or the PUSCH.

In one configuration, referring to FIG. 6, the BWP switch delay 614 may be based on a reference slot size.

In one configuration, referring to FIG. 6, the BWP switch delay 614 may be based on a bandwidth of one or more of the first BWP or the second BWP.

In one configuration, referring to FIG. 6, the BWP switch delay 614 may be based on a frequency difference between the first BWP and the second BWP.

Figure 8:
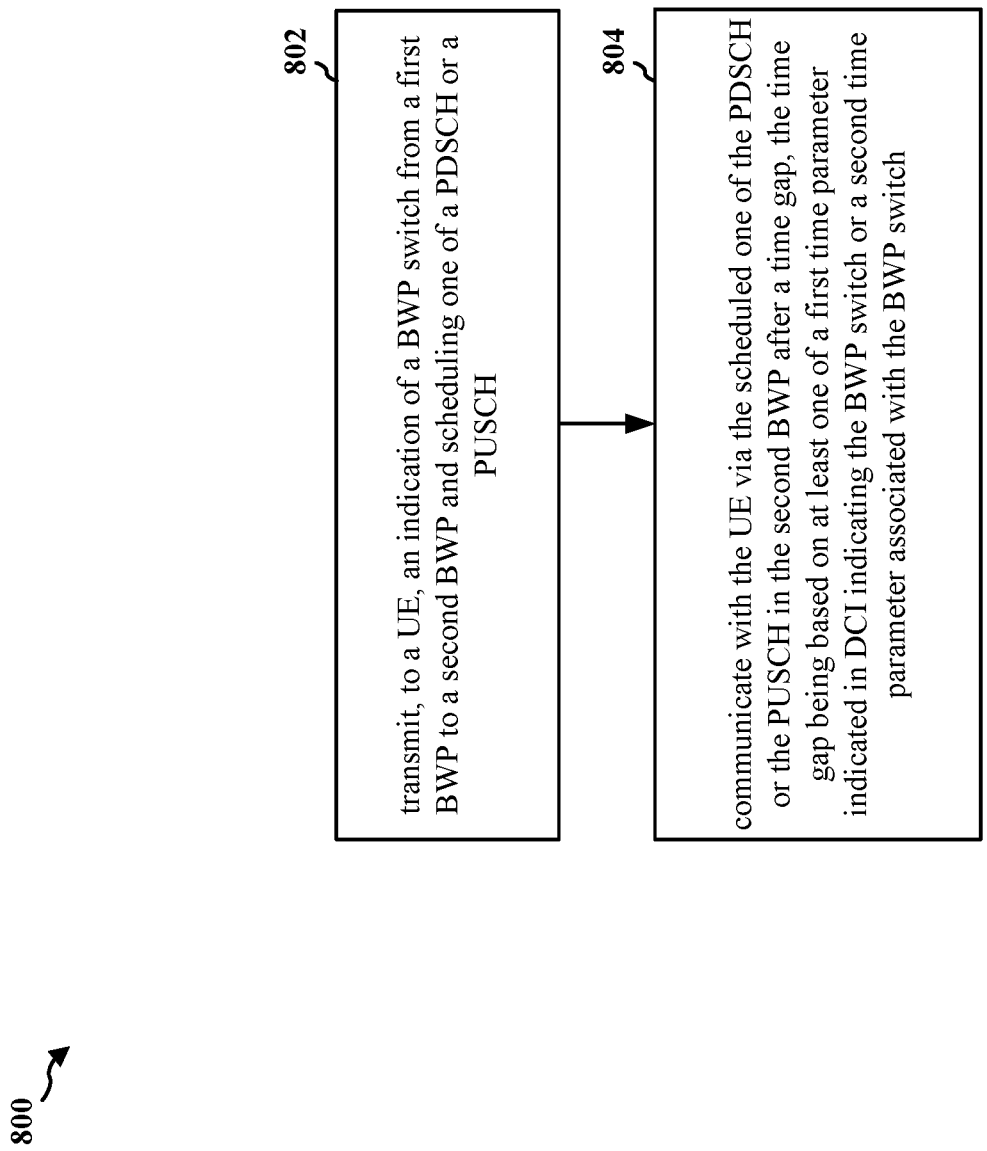
FIG. 8 is a flowchart illustrating a method of wireless communication performed by a base station that supports BWP switching in accordance with some aspects of the present disclosure.

FIG. 8 is a flowchart illustrating a method of wireless communication 800 performed by a base station that supports BWP switching in accordance with aspects of the present disclosure. The method may be performed by a base station (such as the base station 102, 310, 504, or 604; or the network entity 902). In block 802, the base station may transmit, to a UE, an indication of a BWP switch from a first BWP to a second BWP and scheduling one of a PDSCH or a PUSCH. For example, block 802 may be performed by the component 199 in FIG. 10. Referring to FIGS. 5 and 6, at 506/606, the base station 504/604 may transmit, to a UE 502/602, an indication of a BWP switch from a first BWP to a second BWP and scheduling one of a PDSCH or a PUSCH.

In block 804, the base station may communicate with the UE via the scheduled one of the PDSCH or the PUSCH in the second BWP after a time gap. The time gap 510 may be based on at least one of a first time parameter indicated in DCI indicating the BWP switch or a second time parameter associated with the BWP switch. The time gap may have a duration that is at least as long as a duration of a BWP switch delay associated with switching from the first BWP to the second BWP. For example, block 804 may be performed by the component 199 in FIG. 10. Referring to FIGS. 5 and 6, at 508/612, the base station 504/604 may communicate with the UE 502/602 via the scheduled one of the PDSCH or the PUSCH in the second BWP after a time gap 510. The time gap 510 may be based on at least one of a first time parameter indicated in DCI indicating the BWP switch or a second time parameter associated with the BWP switch.

In one configuration, the BWP switch may include a switch from a first SCS to a second SCS.

In one configuration, the indication may be included in one or more DCI messages. The one or more DCI messages may schedule the PDSCH, and the time gap may correspond to a K0 delay.

In one configuration, the indication may be included in one or more DCI messages. The one or more DCI messages may schedule the PUSCH, and the time gap may correspond to a K2 delay.

In one configuration, the indication may be included in one or more DCI messages. The first time parameter may correspond to a first time delay. The second time parameter may correspond to a second time delay. The one or more DCI messages may consist of a single DCI message that indicates the BWP switch and the first time delay. The first time delay may be at least as long as the second time delay.

In one configuration, the single DCI message may indicate the first time delay via a first quantity of bits that is greater than a second quantity of bits associated with indicating a K0 delay or a K2 delay without a BWP switch.

In one configuration, the indication may be included in one or more DCI messages. The first time parameter may correspond to a first time delay. The second time parameter may correspond to a second time delay. The one or more DCI messages may consist of a single DCI message that indicates the BWP switch and the first time delay. The first time delay may correspond to a first quantity of slots having lengths that are each associated with either the first BWP or the second BWP. The time gap may further include the second time delay based on a numerology-dependent offset.

In one configuration, the numerology-dependent offset may correspond to a number of slots having lengths that are each associated with either the first BWP or the second BWP, or an absolute length of time.

In one configuration, the time gap between the single DCI message and the scheduled one of the PDSCH or the PUSCH may include a sum of the first time delay and the numerology-dependent offset.

In one configuration, the indication may be included in one or more DCI messages. The second time parameter may correspond to a second time delay. The one or more DCI messages may consist of a first DCI message indicating the BWP switch from the first BWP to the second BWP and a second DCI message scheduling the one of the PDSCH or the PUSCH. A time lapse between the first DCI message and the second DCI message may be at least as long as the second time delay associated with the BWP switch from the first BWP to the second BWP.

In one configuration, the first time parameter may correspond to a first time delay. The second time parameter may correspond to a multiplier associated with a SCS for the scheduled one of the PDSCH or the PUSCH. The time gap may include a product of a total length of the first time delay and the multiplier.

In one configuration, the first time parameter may correspond to a first quantity of slots. The second time parameter may correspond to a reference slot size. The time gap may be based on the first time parameter corresponding to the first quantity of slots and the reference slot size.

In one configuration, the first time parameter may correspond to a first quantity of slots. The time gap may include a total length of the first quantity of reference slots having lengths that are each associated with a reference SCS.

In one configuration, the indication may be included in one or more DCI messages. The one or more DCI messages may consist of a single DCI message. The first time parameter may correspond to a first quantity of slots. The second time parameter may be based on a numerology of a PDCCH via which the single DCI message is transmitted. The time gap may be based on the first time parameter corresponding to the first quantity of slots and the numerology of the PDCCH.

In one configuration, the numerology of the PDCCH may be different than a numerology for the scheduled one of the PDSCH or the PUSCH.

In one configuration, referring to FIG. 6, the BWP switch delay 614 may be based on a reference slot size.

In one configuration, referring to FIG. 6, the BWP switch delay 614 may be based on a bandwidth of one or more of the first BWP or the second BWP.

In one configuration, referring to FIG. 6, the BWP switch delay 614 may be based on a frequency difference between the first BWP and the second BWP.

Figure 9:
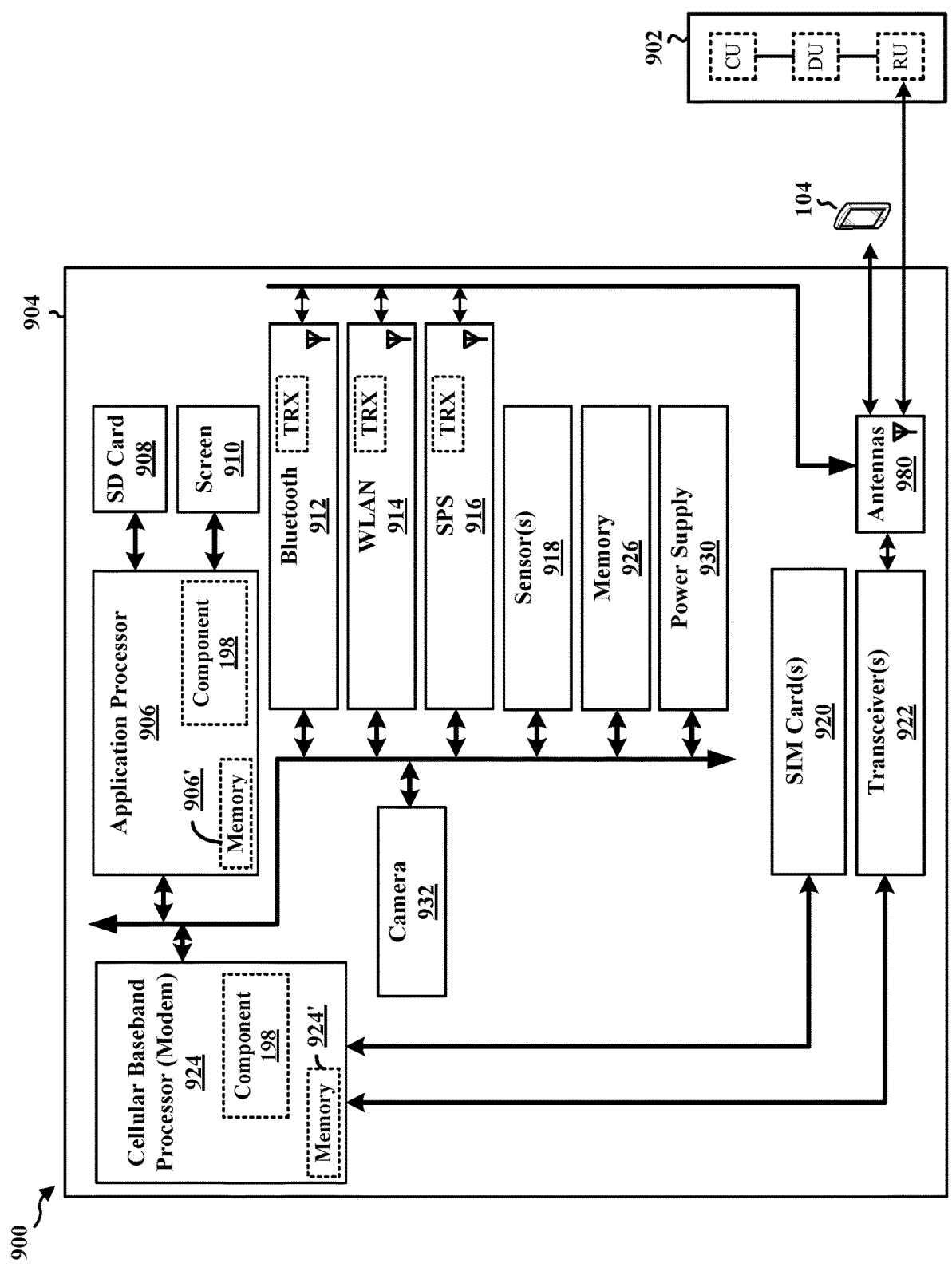
FIG. 9 is a diagram illustrating an example of a hardware implementation for an example apparatus or network entity.

FIG. 9 is a diagram 900 illustrating an example of a hardware implementation for an apparatus 904. The apparatus 904 may be a UE, a component of a UE, or may implement UE functionality. In some aspects, the apparatus 904 may include a cellular baseband processor 924 (also referred to as a modem) coupled to one or more transceivers 922 (for example, cellular RF transceiver). The cellular baseband processor 924 may include on-chip memory 924'. In some aspects, the apparatus 904 may further include one or more subscriber identity modules (SIM) cards 920 and an application processor 906 coupled to a secure digital (SD) card 908 and a screen 910. The application processor 906 may include on-chip memory 906'. In some aspects, the apparatus 904 may further include a Bluetooth module 912, a WLAN module 914, an SPS module 916 (for example, GNSS module), one or more sensor modules 918 (for example, barometric pressure sensor/altimeter; motion sensor such as inertial management unit (IMU), gyroscope, or accelerometer(s); light detection and ranging (LIDAR), radio assisted detection and ranging (RADAR), sound navigation and ranging (SONAR), magnetometer, audio or other technologies used for positioning), additional memory modules 926, a power supply 930, or a camera 932. The Bluetooth module 912, the WLAN module 914, and the SPS module 916 may include an on-chip transceiver (TRX) (or in some cases, just a receiver (RX)). The Bluetooth module 912, the WLAN module 914, and the SPS module 916 may include their own dedicated antennas or utilize the antennas 980 for communication. The cellular baseband processor 924 communicates through the transceiver(s) 922 via one or more antennas 980 with the UE 104 or with an RU associated with a network entity 902. The cellular baseband processor 924 and the application processor 906 may each include a computer-readable medium/memory 924', 906', respectively. The additional memory modules 926 may also be considered a computer-readable medium/memory. Each computer-readable medium/memory 924', 906', 926 may be non-transitory. The cellular baseband processor 924 and the application processor 906 are each responsible for general processing, including the execution of software stored on the computer-readable medium/memory. The software, when executed by the cellular baseband processor 924/application processor 906, causes the cellular baseband processor 924/application processor 906 to perform the various functions described supra. The computer-readable medium/memory may also be used for storing data that is manipulated by the cellular baseband processor 924/application processor 906 when executing software. The cellular baseband processor 924/application processor 906 may be a component of the UE 350 and may include the memory 360 or at least one of the TX processor 368, the RX processor 356, and the controller/processor 359. In one configuration, the apparatus 904 may be a processor chip (modem or application) and include just the cellular baseband processor 924 or the application processor 906, and in another configuration, the apparatus 904 may be the entire UE (for example, see 350 of FIG. 3) and include the additional modules of the apparatus 904.

As discussed supra, the component 198 is configured to receive, from a base station, an indication of a BWP switch from a first BWP to a second BWP. The component 198 is further configured to communicate with the base station, via a PDSCH or a PUSCH, in the second BWP based on a time gap. The time gap may be based on at least one of a first time parameter associated with the indication or a second time parameter associated with the BWP switch. The time gap may have a duration that is at least as long as a first duration of a BWP switch delay associated with switching from the first BWP to the second BWP. The component 198 may be within the cellular baseband processor 924, the application processor 906, or both the cellular baseband processor 924 and the application processor 906. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 904 may include a variety of components configured for various functions. In one configuration, the apparatus 904, and in particular the cellular baseband processor 924 or the application processor 906, includes means for receiving, from a base station, an indication of a BWP switch from a first BWP to a second BWP. The apparatus 904, and in particular the cellular baseband processor 924 or the application processor 906, includes means for communicating with the base station, via a PDSCH or a PUSCH, in the second BWP based on a time gap. The time gap may be based on at least one of a first time parameter associated with the indication or a second time parameter associated with the BWP switch. The time gap may have a duration that is at least as long as a first duration of a BWP switch delay associated with switching from the first BWP to the second BWP.

The means may be the component 198 of the apparatus 904 configured to perform the functions recited by the means. As described supra, the apparatus 904 may include the TX processor 368, the RX processor 356, and the controller/processor 359. As such, in one configuration, the means may be the TX processor 368, the RX processor 356, or the controller/processor 359 configured to perform the functions recited by the means.

Figure 10:
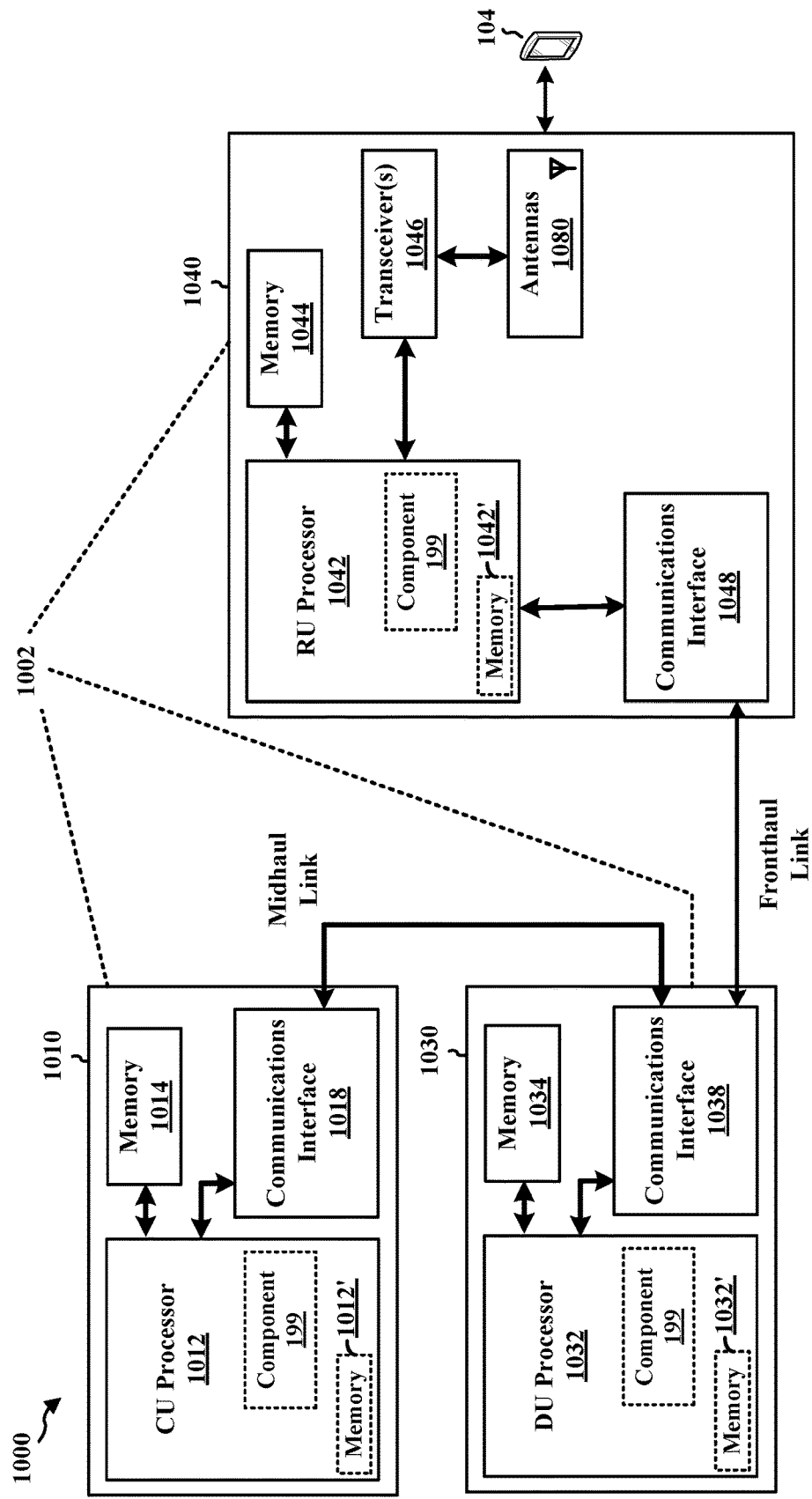
FIG. 10 is a diagram illustrating an example of a hardware implementation for an example network entity.

FIG. 10 is a diagram 1000 illustrating an example of a hardware implementation for a network entity 1002. The network entity 1002 may be a BS, a component of a BS, or may implement BS functionality. The network entity 1002 may include at least one of a CU 1010, a DU 1030, or an RU 1040. For example, depending on the layer functionality handled by the component 199, the network entity 1002 may include the CU 1010; both the CU 1010 and the DU 1030; each of the CU 1010, the DU 1030, and the RU 1040; the DU 1030; both the DU 1030 and the RU 1040; or the RU 1040. The CU 1010 may include a CU processor 1012. The CU processor 1012 may include on-chip memory 1012'. In some aspects, the CU 1010 may further include additional memory modules 1014 and a communications interface 1018. The CU 1010 communicates with the DU 1030 through a midhaul link, such as an F1 interface. The DU 1030 may include a DU processor 1032. The DU processor 1032 may include on-chip memory 1032'. In some aspects, the DU 1030 may further include additional memory modules 1034 and a communications interface 1038. The DU 1030 communicates with the RU 1040 through a fronthaul link. The RU 1040 may include an RU processor 1042. The RU processor 1042 may include on-chip memory 1042'. In some aspects, the RU 1040 may further include additional memory modules 1044, one or more transceivers 1046, antennas 1080, and a communications interface 1048. The RU 1040 communicates with the UE 104. The on-chip memory 1012', 1032', 1042' and the additional memory modules 1014, 1034, 1044 may each be considered a computer-readable medium/memory. Each computer-readable medium/memory may be non-transitory. Each of the processors 1012, 1032, 1042 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit, to a UE, an indication of a BWP switch from a first BWP to a second BWP. The component 199 is further configured to communicate with the UE, via a PDSCH or a PUSCH, in the second BWP based on a time gap. The time gap may be based on at least one of a first time parameter associated with the indication or a second time parameter associated with the BWP switch. The time gap may have a duration that is at least as long as a first duration of a BWP switch delay associated with switching from the first BWP to the second BWP. The component 199 may be within one or more processors of one or more of the CU 1010, DU 1030, and the RU 1040. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1002 may include a variety of components configured for various functions. In one configuration, the network entity 1002 includes means for transmitting, to a UE, an indication of a BWP switch from a first BWP to a second BWP. The network entity 1002 includes means for communicating with the UE, via a PDSCH or a PUSCH, in the second BWP based on a time gap. The time gap may be based on at least one of a first time parameter associated with the indication or a second time parameter associated with the BWP switch. The time gap may have a duration that is at least as long as a first duration of a BWP switch delay associated with switching from the first BWP to the second BWP.

The means may be the component 199 of the network entity 1002 configured to perform the functions recited by the means. As described supra, the network entity 1002 may include the TX processor 316, the RX processor 370, and the controller/processor 375. As such, in one configuration, the means may be the TX processor 316, the RX processor 370, or the controller/processor 375 configured to perform the functions recited by the means.

According to aspects of the present disclosure, the base station, may transmit to the UE, and the UE may receive from the base station, an indication of a BWP switch from a first BWP to a second BWP. The UE and the base station may communicate with each other via a PDSCH or a PUSCH, in the second BWP based on a time gap. The time gap may be based on at least one of a first time parameter associated with the indication or a second time parameter associated with the BWP switch. The time gap may have a duration that is at least as long as a first duration of a BWP switch delay associated with switching from the first BWP to the second BWP. Aspects may relate to techniques for indicating the time gap in a bit width efficient manner when the BWP switch is in or to a higher frequency band. Therefore, the number of signaling bits may not be increased, and the techniques may be scalable for future SCS increases. Further, by defining the BWP switch delay based on the reference slot size, the bandwidth, or the frequency difference in some aspects, the BWP switch delay may be different for different situations, improving resource usage efficiency by reducing the BWP switch delay in situations where a smaller BWP switch delay may be sufficient.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, for example, "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE including receiving, from a base station, an indication of a BWP switch from a first BWP to a second BWP; and communicating with the base station, via a PDSCH or a PUSCH, in the second BWP based on a time gap, the time gap being based on at least one of a first time parameter associated with the indication or a second time parameter associated with the BWP switch, the time gap having a duration that is at least as long as a first duration of a BWP switch delay associated with switching from the first BWP to the second BWP.

Aspect 2 is the method of aspect 1, where the BWP switch includes a switch from a first SCS to a second SCS.

Aspect 3 is the method of any of aspects 1 and 2, where the indication is received in one or more DCI messages, and where: the one or more DCI messages schedule the PDSCH, and the time gap corresponds to a K0 delay; or the one or more DCI messages schedule the PUSCH, and the time gap corresponds to a K2 delay.

Aspect 4 is the method of any of aspects 1 to 3, where the indication is received in one or more DCI messages, the first time parameter is the time gap, the second time parameter is the BWP switch delay, the one or more DCI messages consist of a single DCI message that indicates the BWP switch and the time gap, and the single DCI message indicates the time gap via a first quantity of bits that is greater than a second quantity of bits associated with indicating a K0 delay or a K2 delay without a BWP switch.

Aspect 5 is the method of any of aspects 1 to 3, where the indication is received in one or more DCI messages, the first time parameter corresponds to a first time delay and a first quantity of slots, the second time parameter corresponds to a second time delay based on a numerology-dependent offset, the one or more DCI messages consist of a single DCI message that indicates the BWP switch and the first time delay, the first time delay corresponds to the first quantity of slots having lengths that are each associated with either the first BWP or the second BWP, and the time gap includes a sum of the first time delay and the numerology-dependent offset.

Aspect 6 is the method of any of aspects 1 to 3, where the indication is received in one or more DCI messages, the second time parameter corresponds to the BWP switch delay, the one or more DCI messages consist of a first DCI message indicating the BWP switch from the first BWP to the second BWP and a second DCI message scheduling the one of the PDSCH or the PUSCH, and a time lapse between the first DCI message and the second DCI message is at least as long as the BWP switch delay associated with the BWP switch from the first BWP to the second BWP.

Aspect 7 is the method of any of aspects 1 to 3, where the first time parameter corresponds to a first time delay and a first quantity of slots, the second time parameter corresponds to a multiplier associated with an SCS for the PDSCH or the PUSCH, the first time delay corresponds to the first quantity of slots having lengths that are each associated with either the first BWP or the second BWP, and the time gap comprises a product of a total length of the first time delay and the multiplier.

Aspect 8 is the method of any of aspects 1 to 3, where the first time parameter corresponds to a first quantity of slots, the second time parameter corresponds to a reference slot size, and the time gap is based on the first time parameter corresponding to the first quantity of slots and the reference slot size.

Aspect 9 is the method of any of aspects 1 to 3, where the indication is received in one or more DCI messages, the one or more DCI messages consist of a single DCI message, the first time parameter corresponds to a first quantity of slots, the second time parameter is based on a numerology of a PDCCH via which the single DCI message is received, and the time gap is based on the first time parameter corresponding to the first quantity of slots and the numerology of the PDCCH.

Aspect 10 is the method of any of aspects 1 and 2, where the time gap is based on a reference slot size.

Aspect 11 is the method of any of aspects 1 and 2, where the time gap is based on a bandwidth of one or more of the first BWP or the second BWP.

Aspect 12 is the method of any of aspects 1 and 2, where the time gap is based on a frequency difference between the first BWP and the second BWP.

Aspect 13 is a method of wireless communication at a base station including transmitting, to a UE, an indication of a BWP switch from a first BWP to a second BWP; and communicating with the UE, via a PDSCH or a PUSCH, in the second BWP based on a time gap, the time gap being based on at least one of a first time parameter associated with the indication or a second time parameter associated with the BWP switch, the time gap having a duration that is at least as long as a first duration of a BWP switch delay associated with switching from the first BWP to the second BWP.

Aspect 14 is the method of aspect 13, where the BWP switch includes a switch from a first SCS to a second SCS.

Aspect 15 is the method of any of aspects 13 and 14, where the indication is transmitted in one or more DCI messages, and where: the one or more DCI messages schedule the PDSCH, and the time gap corresponds to a K0 delay; or the one or more DCI messages schedule the PUSCH, and the time gap corresponds to a K2 delay.

Aspect 16 is the method of any of aspects 13 to 15, where the indication is transmitted in one or more DCI messages, the first time parameter is the time gap, the second time parameter is the BWP switch delay, the one or more DCI messages consist of a single DCI message that indicates the BWP switch and the time gap, and the single DCI message indicates the time gap via a first quantity of bits that is greater than a second quantity of bits associated with indicating a K0 delay or a K2 delay without a BWP switch.

Aspect 17 is the method of any of aspects 13 to 15, where the indication is transmitted in one or more DCI messages, the first time parameter corresponds to a first time delay and a first quantity of slots, the second time parameter corresponds to a second time delay based on a numerology-dependent offset, the one or more DCI messages consist of a single DCI message that indicates the BWP switch and the first time delay, the first time delay corresponds to the first quantity of slots having lengths that are each associated with either the first BWP or the second BWP, and the time gap includes a sum of the first time delay and the numerology-dependent offset.

Aspect 18 is the method of any of aspects 13 to 15, where the indication is transmitted in one or more DCI messages, the second time parameter corresponds to the BWP switch delay, the one or more DCI messages consist of a first DCI message indicating the BWP switch from the first BWP to the second BWP and a second DCI message scheduling the one of the PDSCH or the PUSCH, and a time lapse between the first DCI message and the second DCI message is at least as long as the BWP switch delay associated with the BWP switch from the first BWP to the second BWP.

Aspect 19 is the method of any of aspects 13 to 15, where the first time parameter corresponds to a first time delay and a first quantity of slots, the second time parameter corresponds to a multiplier associated with an SCS for the PDSCH or the PUSCH, the first time delay corresponds to the first quantity of slots having lengths that are each associated with either the first BWP or the second BWP, and the time gap comprises a product of a total length of the first time delay and the multiplier.

Aspect 20 is the method of any of aspects 13 to 15, where the first time parameter corresponds to a first quantity of slots, the second time parameter corresponds to a reference slot size, and the time gap is based on the first time parameter corresponding to the first quantity of slots and the reference slot size.

Aspect 21 is the method of any of aspects 13 to 15, where the indication is transmitted in one or more DCI messages, the one or more DCI messages consist of a single DCI message, the first time parameter corresponds to a first quantity of slots, the second time parameter is based on a numerology of a PDCCH via which the single DCI message is transmitted, and the time gap is based on the first time parameter corresponding to the first quantity of slots and the numerology of the PDCCH.

Aspect 22 is the method of any of aspects 13 and 14, where the time gap is based on a reference slot size.

Aspect 23 is the method of any of aspects 13 and 14, where the time gap is based on a bandwidth of one or more of the first BWP or the second BWP.

Aspect 24 is the method of any of aspects 13 and 14, where the time gap is based on a frequency difference between the first BWP and the second BWP.

Aspect 25 is an apparatus for wireless communication including at least one processor coupled to a memory and, based at least in part on information stored in the memory, the at least one processor is configured to implement a method as in any of aspects 1 to 24.

Aspect 26 may be combined with aspect 25 and further includes a transceiver coupled to the at least one processor.

Aspect 27 is an apparatus for wireless communication including means for implementing any of aspects 1 to 24.

Aspect 28 is a non-transitory computer-readable storage medium storing computer executable code, where the code when executed by a processor causes the processor to implement any of aspects 1 to 24.

Various aspects have been described herein. These and other aspects are within the scope of the following claims.

What is claimed is:

1. A method of wireless communication at a user equipment (UE), comprising:

transmitting, to a base station, a request for a bandwidth part switch from a first BWP to a second BWP, wherein the request indicates a BWP switch delay;

receiving, from the base station, an indication of the BWP switch from the first BWP to the second BWP; and communicating with the base station, via a physical downlink shared channel (PDSCH) or a physical uplink shared channel (PUSCH), in the second BWP based on in accordance with a time gap, the time gap being associated with at least one of a first time parameter associated with the indication or a second time parameter associated with the BWP switch, the time gap having a duration that is at least as long as a first duration of the BWP switch delay associated with switching from the first BWP to the second BWP, wherein the BWP switch delay is associated with a frequency location difference between a first starting resource block (RB) of the first BWP and a second starting RB of the second BWP.

2. The method of claim 1, wherein the BWP switch comprises a switch from a first subcarrier spacing (SCS) to a second SCS.

3. The method of claim 1, wherein the indication is received in one or more downlink control information (DCI) messages, and wherein:

the one or more DCI messages schedule the PDSCH, and the time gap corresponds to a K0 delay; or the one or more DCI messages schedule the PUSCH, and the time gap corresponds to a K2 delay.

4. The method of claim 1, wherein:

the indication is received in one or more downlink control information (DCI) messages, the first time parameter is the time gap, the second time parameter is the BWP switch delay, and the one or more DCI messages consist of a single DCI message that indicates the BWP switch and the time gap.

5. The method of claim 1, wherein:

the indication is received in one or more downlink control information (DCI) messages, the first time parameter corresponds to a first time delay and a first quantity of slots, the second time parameter corresponds to a second time delay associated with based on a numerology-dependent offset, the one or more DCI messages consist of a single DCI message that indicates the BWP switch and the first time delay, the first time delay corresponds to the first quantity of slots having lengths that are each associated with either the first BWP or the second BWP, and the time gap includes a sum of the first time delay and the numerology-dependent offset.

6. The method of claim 1, wherein:

the indication is received in one or more downlink control information (DCI) messages, the second time parameter corresponds to the BWP switch delay, the one or more DCI messages consist of a first DCI message indicating the BWP switch from the first BWP to the second BWP and a second DCI message scheduling the one of the PDSCH or the PUSCH, and a time lapse between the first DCI message and the second DCI message is at least as long as the BWP switch delay associated with the BWP switch from the first BWP to the second BWP.

7. The method of claim 1, wherein:
the first time parameter corresponds to a first time delay and a first quantity of slots,
the second time parameter corresponds to a multiplier associated with a subcarrier spacing (SCS) for the PDSCH or the PUSCH,
the first time delay corresponds to the first quantity of slots having lengths that are each associated with either the first BWP or the second BWP, and
the time gap comprises a product of a total length of the first time delay and the multiplier.

8. The method of claim 1, wherein:
the first time parameter corresponds to a first quantity of slots,
the second time parameter corresponds to a reference slot size, and
the time gap is associated with the first time parameter corresponding to the first quantity of slots and the reference slot size.

9. The method of claim 1, wherein:
the indication is received in one or more downlink control information (DCI) messages,
the one or more DCI messages consist of a single DCI message,
the first time parameter corresponds to a first quantity of slots,
the second time parameter is based on a numerology of a physical downlink control channel (PDCCH) via which the single DCI message is received, and
the time gap is associated with the first time parameter corresponding to the first quantity of slots and the numerology of the PDCCH.

10. The method of claim 1, wherein the BWP switch delay is associated with a reference slot size.

11. The method of claim 1, wherein the BWP switch delay is associated with a bandwidth of one or more of the first BWP or the second BWP.

12. An apparatus for wireless communication at a user equipment (UE), comprising:
at least one processor; and
at least one memory communicatively coupled with the at least one processor and storing processor-readable code that, when executed by the at least one processor, is configured to cause the UE to:
transmit, to a base station, a request for a bandwidth part switch from a first BWP to a second BWP, wherein the request indicates a BWP switch delay;
receive, from the base station, an indication of the BWP switch from the first BWP to the second BWP; and
communicate with the base station, via a physical downlink shared channel (PDSCH) or a physical uplink shared channel (PUSCH), in the second BWP in accordance with a time gap, the time gap being associated with at least one of a first time parameter associated with the indication or a second time parameter associated with the BWP switch, the time gap having a duration that is at least as long as a first duration of the BWP switch delay associated with switching from the first BWP to the second BWP, wherein the BWP switch delay is associated with a frequency location difference between a first starting resource block (RB) of the first BWP and a second starting RB of the second BWP.

13. The apparatus of claim 12, wherein the BWP switch comprises a switch from a first subcarrier spacing (SCS) to a second SCS.

14. The apparatus of claim 12, further comprising a transceiver coupled to the at least one processor.

15. A method of wireless communication at a base station, comprising:
receiving, from a user equipment (UE), a request for a bandwidth part (BWP) switch from a first BWP to a second BWP, wherein the request indicates a BWP switch delay;
transmitting, to the UE, an indication of the BWP switch from the first BWP to the second BWP; and
communicating with the UE, via a physical downlink shared channel (PDSCH) or a physical uplink shared channel (PUSCH), in the second BWP in accordance with a time gap, the time gap being associated with at least one of a first time parameter associated with the indication or a second time parameter associated with the BWP switch, the time gap having a duration that is at least as long as a first duration of the BWP switch delay associated with switching from the first BWP to the second BWP, wherein the BWP switch delay is associated with a frequency location difference between a first starting resource block (RB) of the first BWP and a second starting RB of the second BWP.

16. The method of claim 15, wherein the BWP switch comprises a switch from a first subcarrier spacing (SCS) to a second SCS.

17. The method of claim 15, wherein the indication is transmitted in one or more downlink control information (DCI) messages, and wherein:
the one or more DCI messages schedule the PDSCH, and the time gap corresponds to a K0 delay; or
the one or more DCI messages schedule the PUSCH, and the time gap corresponds to a K2 delay.

18. The method of claim 15, wherein:
the indication is transmitted in one or more downlink control information (DCI) messages,
the first time parameter is the time gap,
the second time parameter is the BWP switch delay, and
the one or more DCI messages consist of a single DCI message that indicates the BWP switch and the time gap.

19. The method of claim 15, wherein:
the indication is transmitted in one or more downlink control information (DCI) messages,
the first time parameter corresponds to a first time delay and a first quantity of slots,
the second time parameter corresponds to a second time delay associated with a numerology-dependent offset,
the one or more DCI messages consist of a single DCI message that indicates the BWP switch and the first time delay,
the first time delay corresponds to the first quantity of slots having lengths that are each associated with either the first BWP or the second BWP, and
the time gap includes a sum of the first time delay and the numerology-dependent offset.

20. The method of claim 15, wherein:
the indication is transmitted in one or more downlink control information (DCI) messages,
the second time parameter corresponds to the BWP switch delay,
the one or more DCI messages consist of a first DCI message indicating the BWP switch from the first BWP to the second BWP and a second DCI message scheduling the one of the PDSCH or the PUSCH, and a time lapse between the first DCI message and the second DCI message is at least as long as the BWP switch delay associated with the BWP switch from the first BWP to the second BWP.

21. The method of claim 15, wherein:
the first time parameter corresponds to a first time delay and a first quantity of slots,
the second time parameter corresponds to a multiplier associated with a subcarrier spacing (SCS) for the PDSCH or the PUSCH,
the first time delay corresponds to the first quantity of slots having lengths that are each associated with either the first BWP or the second BWP, and
the time gap comprises a product of a total length of the first time delay and the multiplier.

22. The method of claim 15, wherein:
the first time parameter corresponds to a first quantity of slots,
the second time parameter corresponds to a reference slot size, and
the time gap is associated with the first time parameter corresponding to the first quantity of slots and the reference slot size.

23. The method of claim 15, wherein:
the indication is transmitted in one or more downlink control information (DCI) messages,
the one or more DCI messages consist of a single DCI message,
the first time parameter corresponds to a first quantity of slots,
the second time parameter is based on a numerology of a physical downlink control channel (PDCCH) via which the single DCI message is transmitted, and
the time gap is associated with the first time parameter corresponding to the first quantity of slots and the numerology of the PDCCH.

24. The method of claim 15, wherein the BWP switch delay is associated with a reference slot size.

25. The method of claim 15, wherein the BWP switch delay is associated with a bandwidth of one or more of the first BWP or the second BWP.

26. An apparatus for wireless communication at a base station, comprising:
at least one processor; and
at least one memory communicatively coupled with the at least one processor and storing processor-readable code that, when executed by the at least one processor, is configured to cause the base station to:
receive, from a user equipment (UE), a request for a bandwidth part switch from a first BWP to a second BWP, wherein the request indicates a BWP switch delay;
transmit, to the UE, an indication of the BWP switch from the first BWP to the second BWP; and
communicate with the UE, via a physical downlink shared channel (PDSCH) or a physical uplink shared channel (PUSCH), in the second BWP in accordance with a time gap, the time gap being associated with at least one of a first time parameter associated with the indication or a second time parameter associated with the BWP switch, the time gap having a duration that is at least as long as a first duration of the BWP switch delay associated with switching from the first BWP to the second BWP, wherein the BWP switch delay is associated with a frequency location difference between a first starting resource block (RB) of the first BWP and a second starting RB of the second BWP.

27. The apparatus of claim 26, wherein the BWP switch comprises a switch from a first subcarrier spacing (SCS) to a second SCS.

28. The apparatus of claim 26, further comprising a transceiver coupled to the at least one processor.

* * * * *